United States Patent [19]
Corder

[11] Patent Number: 5,692,906

[45] Date of Patent: *Dec. 2, 1997

[54] METHOD OF DIAGNOSING AND REMEDIATING A DEFICIENCY IN COMMUNICATIONS SKILLS

[76] Inventor: Paul R. Corder, 522 Hillhurst, Baytown, Tex. 77521-4008

[*] Notice: The term of this patent shall not extend beyond the expiration date of Pat. No 5,387,104.

[21] Appl. No.: 484,534

[22] Filed: Jun. 7, 1995

Related U.S. Application Data

[63] Continuation-in-part of Ser. No. 385,032, Feb. 7, 1995, abandoned, which is a continuation of Ser. No. 192,497, Feb. 7, 1994, Pat. No. 5,387,104, which is a continuation of Ser. No. 863,687, Apr. 1, 1992, Pat. No. 5,302,132.

[51] Int. Cl.$^6$ .................................................. G09B 19/00
[52] U.S. Cl. ........................ 434/156; 434/118; 434/307 R; 434/350; 434/169; 395/160; 395/245; 395/927; 381/51
[58] Field of Search .................................. 434/118, 156, 434/157, 169, 185, 307 R, 308, 332, 323, 347, 335, 350, 362, 365; 395/144, 152, 154, 159, 160, 827, 201–245; 364/419.03, 411; 345/173, 180; 381/51; 463/1, 23, 42

[56] References Cited

U.S. PATENT DOCUMENTS

| | | |
|---|---|---|
| 4,576,578 | 3/1986 | Parker et al. . |
| 4,694,494 | 9/1987 | Woolfson . |
| 4,895,518 | 1/1990 | Arnold et al. . |
| 4,954,969 | 9/1990 | Tsumura . |
| 5,018,082 | 5/1991 | Obata et al. . |
| 5,111,409 | 5/1992 | Gasper et al. . |
| 5,134,560 | 7/1992 | Ferriter et al. . |
| 5,267,865 | 12/1993 | Lee et al. . |
| 5,302,132 | 4/1994 | Corder . |
| 5,387,104 | 2/1995 | Corder . |

OTHER PUBLICATIONS

M.L. Prevey, et al., A method of assessing the efficacy of memory rehabilitation techniques using a "real-world" memory task: Learning a computer language 28 J. Rehab. Res. No. 4 (1991) pp. 53–60.

*Primary Examiner*—Joe Cheng
*Attorney, Agent, or Firm*—Mark R. Wisner

[57] ABSTRACT

A method of identifying strengths and weaknesses in a student's ability to use their sensory channels which integrates five basic processes into a series of testing procedures. First, the nature of the test is specified, either by a teacher or by a pre-programmed default stored in the memory of a computer. Second, test material suitable for use with a test of the specified nature is identified and extracted from the memory of the computer and then presented to the student using the outputs of the computer. The responses of the student through the inputs of the computer are then recorded and analyzed for patterns which are capable of being correlated with deficiencies in the sensory channels under test. Finally, procedures are recommended for remediating the deficiencies identified by analysis of the performance data.

2 Claims, 29 Drawing Sheets

Student's Workstation

1100
Stop
1102

1110
1112

| CHANNEL OF LEARNING | SYSTEM STIMULI | STUDENT RESPONSES | EVALUATION CRITERIA | COMMENTS |
|---|---|---|---|---|
| AUDITORY | Colors<br>Shapes<br>Objects<br>Phonogram<br>Syllable<br>Word<br>Phrase<br>Sentence<br>Paragraph | • Say as directed<br>• Record voice<br>• Click on choice<br>  - Mouse<br>  - Touch screen<br>  - Graphics tablet<br>• Trace as directed<br>  - Mouse<br>  - Touch screen<br>  - Graphics tablet<br>• Reduce to notes<br>  - Typing<br>  - Writing<br>• Translating<br>• Brailling<br>• Hand Signing | • Accuracy in recording<br>• Accuracy in response (i.e., tracing, typing, writing, etc)<br>• Number of tries<br>• Time used total and per try<br>• Frequency content and distribution<br>• Duration of sound<br>• Mean Square Value<br>• Probability Density Function<br>• Power Spectral Density Function<br>• Auto-correlation Function<br>• Replicability<br>• Improvement<br>• Retentivity | • Statistical frequency of accuracy<br>• FFT (Fast Fourier Transforms)<br>• Waveform comparison<br>• Energy associated with waveform<br>• Properties of waveform in amplitude domain<br>• Waveform properties in time domain<br>• Properties of waveform in frequency domain<br>• Standard suitable to regional differences<br>• Location on screen<br>• Beginning point<br>• Path of trace<br>• Deviation from preferred path produces beeps or flashes and is recorded in memory<br>• Adherence to the preferred path by the student automatically satisfies criteria for aspects, such as slant, spacing, and proportion of parts<br>• Records saved in memory |

FIG. 12(a)

| CHANNEL OF LEARNING | SYSTEM STIMULI | STUDENT RESPONSES | EVALUATION CRITERIA | COMMENTS |
|---|---|---|---|---|
| VISUAL | Colors<br>Shapes<br>Objects<br>Outline Shapes<br>- Letters<br>- Lines<br>- Arcs<br>- Curves<br>- Other<br>Phonogram<br>Syllable<br>Word<br>Phrase<br>Sentence<br>Paragraph | • Click on choice<br>  - Mouse<br>  - Touch screen<br>  - Graphics tablet<br>• Trace as directed<br>  - Mouse<br>  - Touch screen<br>  - Graphics tablet<br>• Type on keyboard<br>• Write<br>  - Touch screen.<br>  - Graphics tablet<br>• Trace within<br>  - Mouse<br>  - Touch screen<br>  - Graphics tablet<br>• Hand Signing | • Accuracy in response (i.e., tracing, typing, writing, etc)<br>• Number of tries<br>• Time used total and per try<br>• Smoothness of tracings<br>• Accuracy in staying within outline shape during tracing<br>• Accuracy influenced by component used?<br>• Replicability<br>• Improvement<br>• Retentivity | • Statistical frequency of accuracy<br>• Location on screen<br>• Beginning point<br>• Path of trace<br>• Deviation from preferred path produces beeps or flashes which are recorded in memory<br>• Adherence to the preferred path by the student automatically satisfies criteria for characteristics, such as slant, spacing, and proportion of parts<br>• Records saved for future analysis |

FIG. 12(b)

| CHANNEL OF LEARNING | SYSTEM STIMULI | STUDENT RESPONSES | EVALUATION CRITERIA | COMMENTS |
|---|---|---|---|---|
| VERBAL | Phonogram<br>Syllable<br>Word<br>Phrase<br>Sentence | • Say as directed<br>• Record voice | • Same as for AUDITORY | • Same as for AUDITORY |
| KINESTHETIC | • Same as for VISUAL | • Same as for VISUAL | • Same as for VISUAL | • Same as for VISUAL |
| TACTILE | • Shapes<br>• Objects<br>• Brailling<br>  - Letters<br>  - Lines<br>  - Arcs<br>  - Curves<br>  - Phonogram<br>  - Syllable<br>  - Word<br>  - Phrase<br>  - Sentence<br>  - Paragraph | • Type of keyboard<br>• Braille<br>• Say as directed / record | • Same as for VISUAL<br>• Comparison of brailled response with stimuli | • Same as for VISUAL |

FIG. 12(c)

METHOD OF DIAGNOSING AND REMEDIATING A DEFICIENCY IN COMMUNICATIONS SKILLS

The present application is a continuation-in-part of application Ser. No. 08/385,032, filed Feb. 7, 1995 and entitled INSTRUCTIONAL SYSTEM FOR COMMUNICATION SKILLS, now abandoned, which is a continuation of application Ser. No. 08/192,497, filed Feb. 7, 1994 and entitled INSTRUCTIONAL SYSTEM FOR IMPROVING COMMUNICATION SKILLS, now issued as U.S. Pat. No. 5,387,104, which is a continuation of application Ser. No. 07/863,687, filed Apr. 1, 1992 and entitled INSTRUCTIONAL SYSTEM AND METHOD FOR IMPROVING COMMUNICATION SKILLS, now issued as U.S. Pat. No. 5,302,132.

BACKGROUND OF THE INVENTION

Portions of the disclosure of this patent document contain material which is subject to copyright protection. The copyright owner has no objection to the facsimile reproduction by anyone of the patent document or the patent disclosure, as it appears in the Patent and Trademark Office patent files or records, but otherwise reserves all copyright rights in this material.

1. Field of the Invention

The present invention relates to the use of a computer based instructional system to diagnose differences in and provide strategies to improve communications skills of individuals accompanied by improvements in their functionality in speaking, spelling, writing, reading, brailling, signing or translating language.

2. Description of the Prior Art

Each new development in communications technology has been touted as having a bright potential capable of revolutionizing education. New pieces of equipment are offered by manufacturers and adopted by school boards intent on fulfilling their educational objectives. All too frequently these pieces of hardware are oversold, under used, and then discarded.

The computer is the latest technology under trial. Computers execute programs, or software. There are four principal categories of educational software. They are tutorial, drill and practice, simulation, and utility. With respect to educational content, tutorial software provides some facts. These facts might range from how to punctuate a sentence to how to use a piece of equipment. Drill and practice programs usually operate with the assumption that the material has already been presented to the student; the programs provide only exercises which reinforce previously presented material or concepts. Some drill and practice programs do include tutorial information on concepts with which the student is having trouble.

Teaching a foreign language is an example of computer assisted drill and practice activity. Here the computer is used to augment verbal drills. In teaching German, the student might be given the stimulus "Ich bin hier" followed by a promp "Du." The student must respond with "Du bist hier." Anything else is judged incorrect.

Simulation programs model particular situations, such as chemical reactions in a test tube when specified chemicals are added together. Because they incorporate "what if" types of questions, simulation programs hasten learning by discovery. However, because of the demanding program design, logic, and programming effort, simulation programs are often limited in their scope and simply not as available as drill and practice packages.

The fourth category, utility, is a collection of programs which function in supporting roles. Examples of such programs include statistical or calculational programs for studying the mathematics of chemical reaction simulation programs. The role of the software in this category is as a tool in the learning process.

Initial applications of microcomputers in the classroom were in the teaching of computer literacy and programming languages, such as LOGO™. Such languages allowed the student to "direct" the computer to follow specified instructions and present the results, usually graphically. Computer labs became very popular in many schools as new instructional procedures were developed to accommodate this new technology. More recent trends have seen the computers move out of the labs and back into the classrooms where they are being used as learning tools.

Seen in this light, the computer has been used as an alternative to textbook exercises or to augment a human drill instructor and has provided no real innovation in pedagogy. Instead, computer assisted instruction has used the superior speed and repeatability of the computer to present improved versions of selected portions of a human teacher's presentation.

Unfortunately, in these four application categories, the computer's speed and accuracy is offset by its inflexibility. The most critical deficiency of even the most advanced current computer mediated instructional programs is the lack of facility in dealing with the different cognitive learning styles of the students using the program.

Learning occurs in a process of stimulus, reaction and reinforcement. Each action may occupy any or all of the available sensory pathways involving seeing, hearing, speaking, touching, or kinetic moving. Learning activities are strongly influenced by experience and culture. There is evidence that sex may have an influence on learning patterns. Young children do not learn the same way as adults. People learning a second language do not learn it the way they learned their first, or native, language. People with sensory or motor handicaps adapt to different learning styles consistent with their existing capabilities. Existing computer mediated instructional applications do not adequately deal with this diversity of learning styles. Learners are constrained to follow preprogrammed patterns that do not evaluate each individual to determine the optimal sequence of stimulus, response and reinforcement that leads to the most efficient learning with the greatest retention. These programs lack the structure and methods necessary to diagnose individual capabilities and efficiencies, provide individualized instruction, and evaluate results.

Further, the sensory channels (as auditory, visual, verbal, kinetic, and tactile) act independently of each other and are unlikely to be utilized equally by any one student. Instead, students tend to learn using one predominant channel, such as visually. Efficient utilization of that, or any other, channel requires the development of a corresponding "set" of communication skills. By identifying deficiencies in the sets of skills used with the lesser utilized channels and remediating any such deficiences, one maximizes their opportunity for learning by providing the opportunity for contribution by these channels to the learning process.

It is the object of this invention to utilize computer technology to integrate multi-sensory stimuli in a comprehensive system for synthesis of individualized evaluation, diagnosis, prescription, instruction, and testing for advancement of communications skills in spoken, written, aural, visual or tactile modes in any of an unlimited number of languages.

It is another object of the present invention to provide a system for identifying deficiencies in the sets of skills utilized in connection with each of the sensory channels and to remediate any such deficiencies.

It is another object of the present invention to provide a system for maximizing a student's opportunity for learning by developing skills which allow the student to learn by efficient utilization of multiple sensory channels.

Other objects of the present invention will be made clear to those skilled in the art by the following description.

SUMMARY OF THE INVENTION

These objectives, and the advantages, of the present invention are accomplished by providing a method, and an apparatus for implementing that method, of diagnosing and remediating a deficiency in a student's communication skills utilizing a computer based system including processing, storage, input and output means comprising the steps of (a) selecting test material from tests stored in the storage means of the computer for testing the communication skill of the student; (b) presenting the test material to the student using computer generated stimuli and the output means of the computer utilizing one or more sensory or motor learning channels selected from the set of available channels; (c) recording the student's responses to the stimuli through the input means to the storage means of the computer; (d) analyzing the recorded responses to identify deficiency in either the sensory channel or sensory channels being utilized for presenting the stimuli or for responding thereto using the processing means of the computer; (e) using the results of the analysis to identify an optimal cognitive strategy combining either utilization of the sensory channel in which a deficiency is identified or a combination of other sensory channels to compensate for the sensory channel in which a deficiency is identified, and the input and output means of the computer to develop proficiency in the communication skills resulting from utilization of the sensory channel(s) in which the deficiency was identified. Once the optimal strategy is identified, the method continues by (f) assessing the results of application of the optimal strategy on the sensory channel in which the deficiency was identified by testing the student's ability to reproduce, recognize, print, cursively write, sign, pronounce, spell, use, translate, or identify the target objective using decision rules stored in the computer for comparing the results of the testing to a predetermined performance criterium stored in the computer, the computer serving as both the means for generating test stimulus; and (g) repeating steps (b) through (f) if the test results do not exceed the predetermined performance criterium.

BRIEF DESCRIPTION OF THE FIGURES

FIG. 6a shows the loops 600–608 for testing the five CHANNELS OF LEARNING. FIG. 6b indicates that the SYSTEM COMPONENTS are evaluated with respect to the five CHANNELS OF LEARNING to address identified needs of the learner. FIG. 6c outlines the assessment of the learner's knowledge of the language. FIG. 6d–6f provides a logical sequence for the teacher to follow in composing a lesson for a student. The "Call Lesson Menu Routines" 650 (FIG. 6d) is expanded in FIG. 6g.

FIG. 7a outlines the logic for assessing the learner's auditory ability. Comments 703, 707, and 713 are provided to the side of certain steps to explain what might happen at that point during the evaluation. FIG. 7b shows the logic for assessing the learner's visual ability. FIG. 7c outlines the logic for assessing the learner's verbal ability. FIG. 7d outlines the logic for assessing the learner's kinesthetic ability.

The images provided on the buttons are representative of the action associated with that button and learning by discovery is encouraged.

Figure 9:
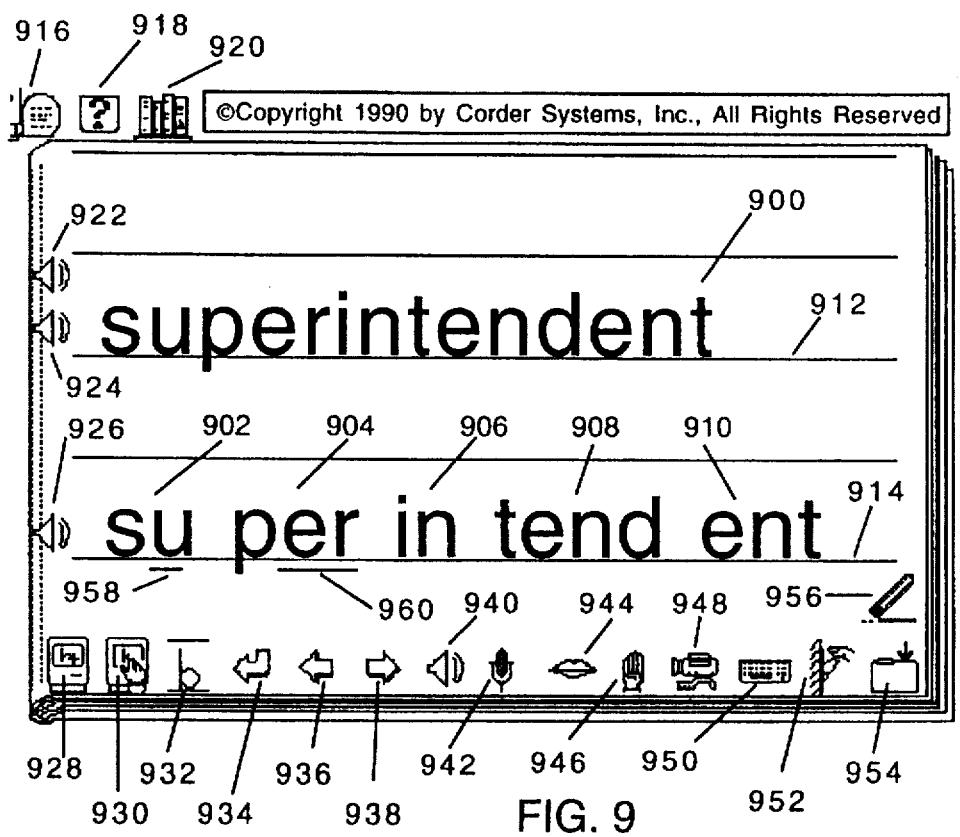
Figure 10A:
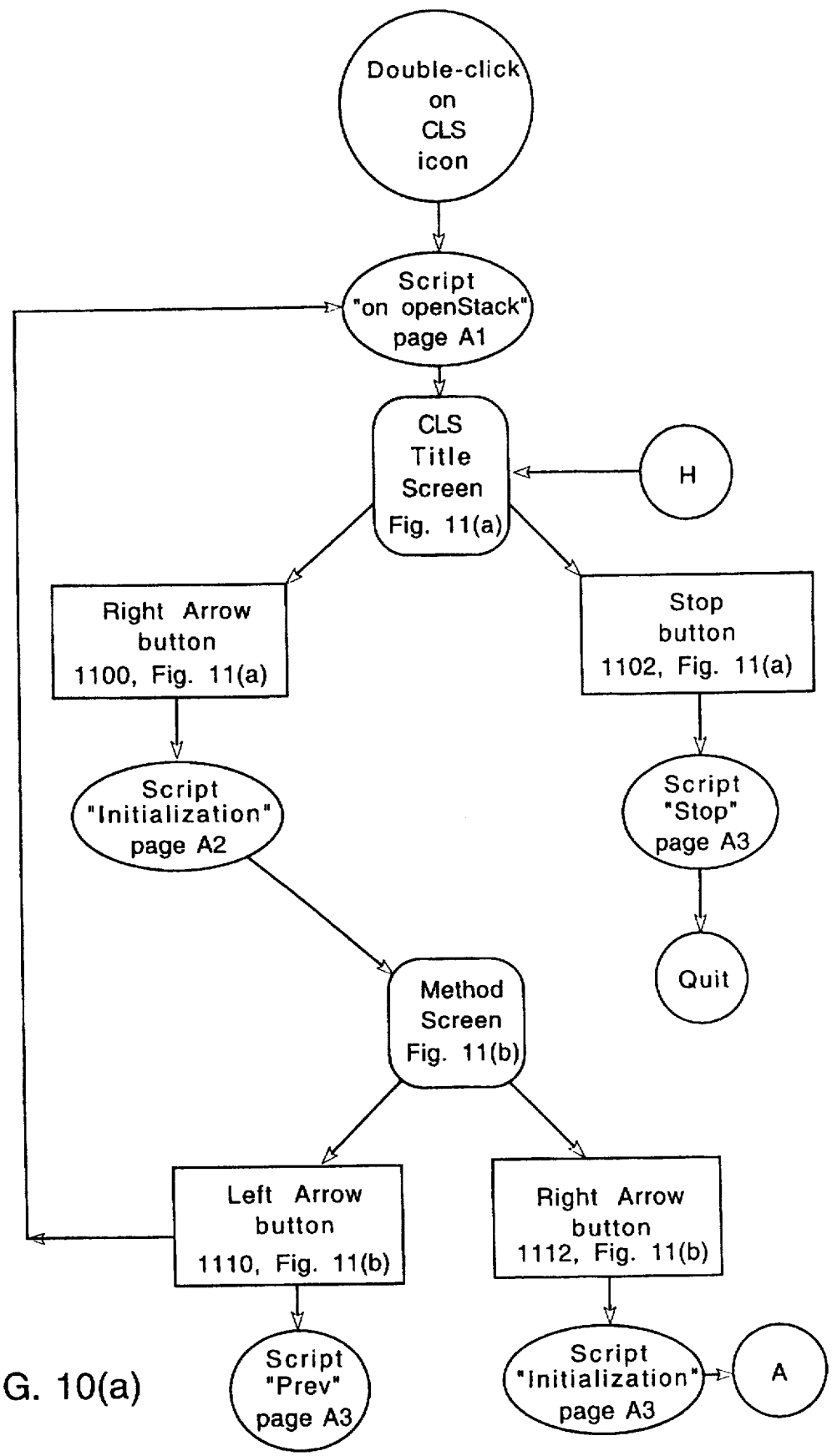
Figure 10B:
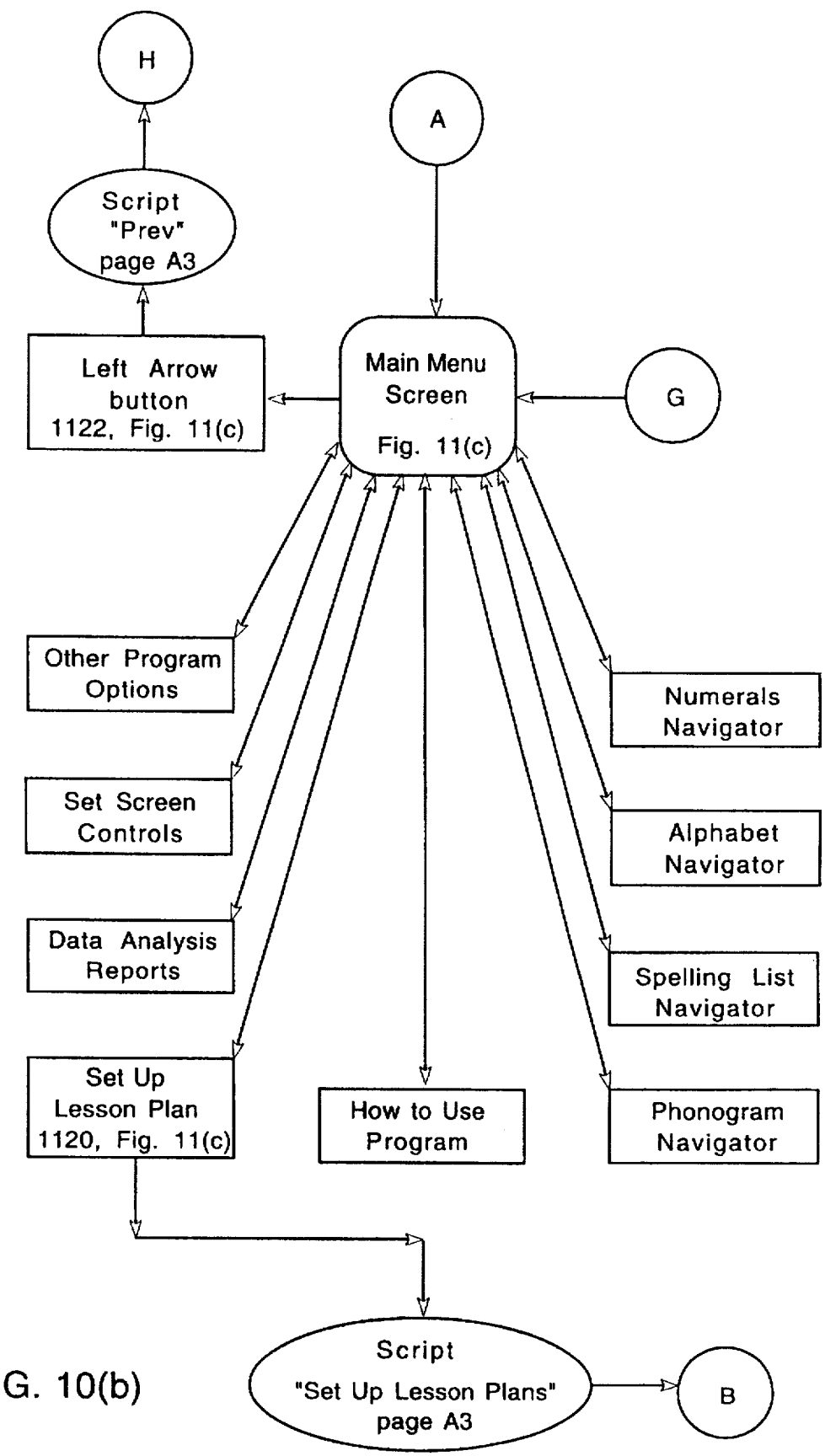
Figure 10C:
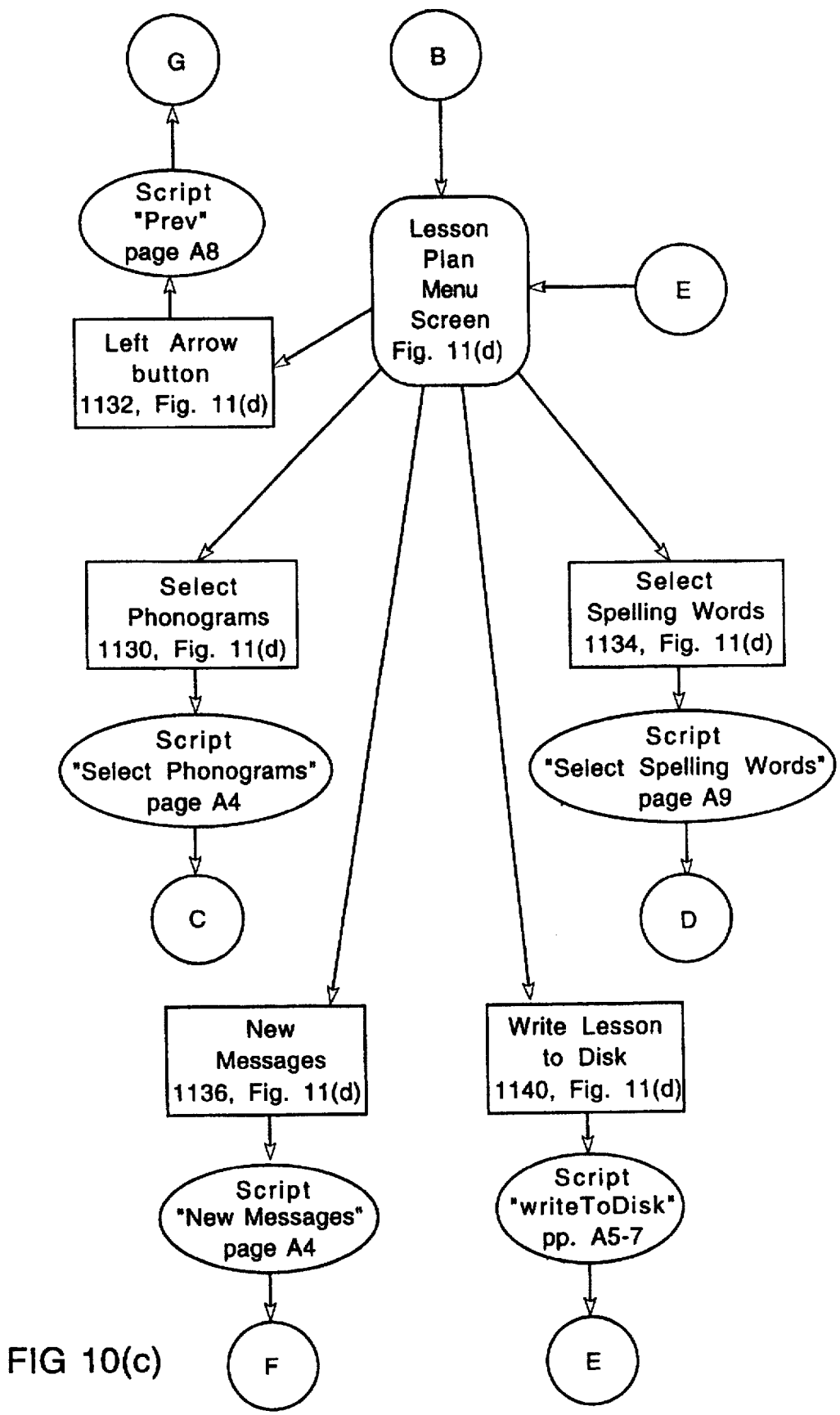
Figure 10D:
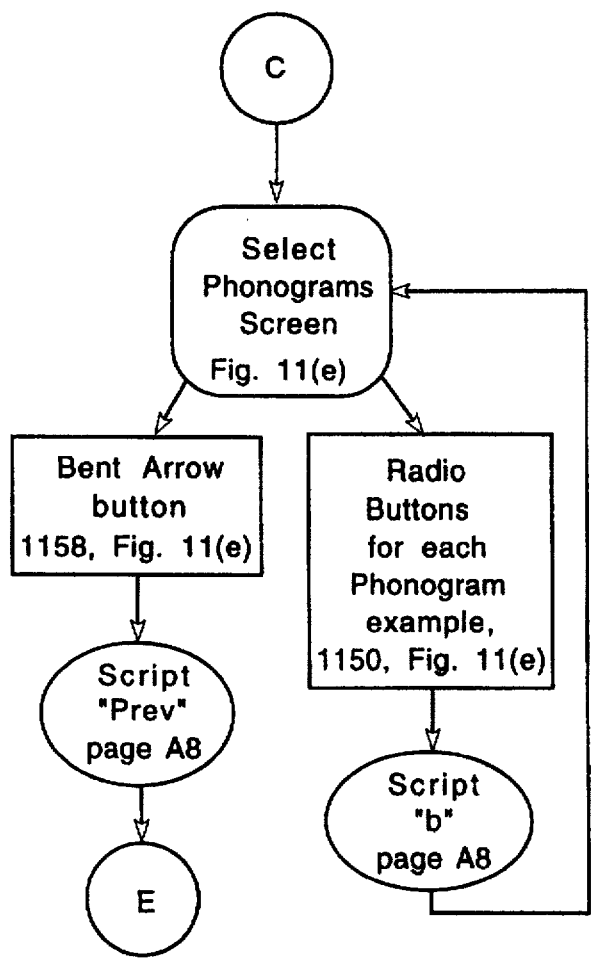
Figure 10E:
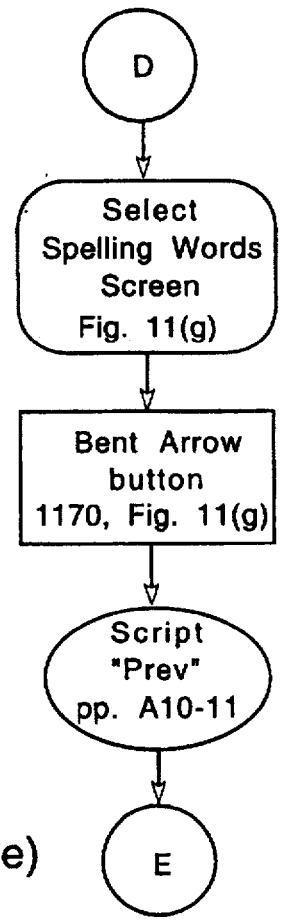
Figure 10F:
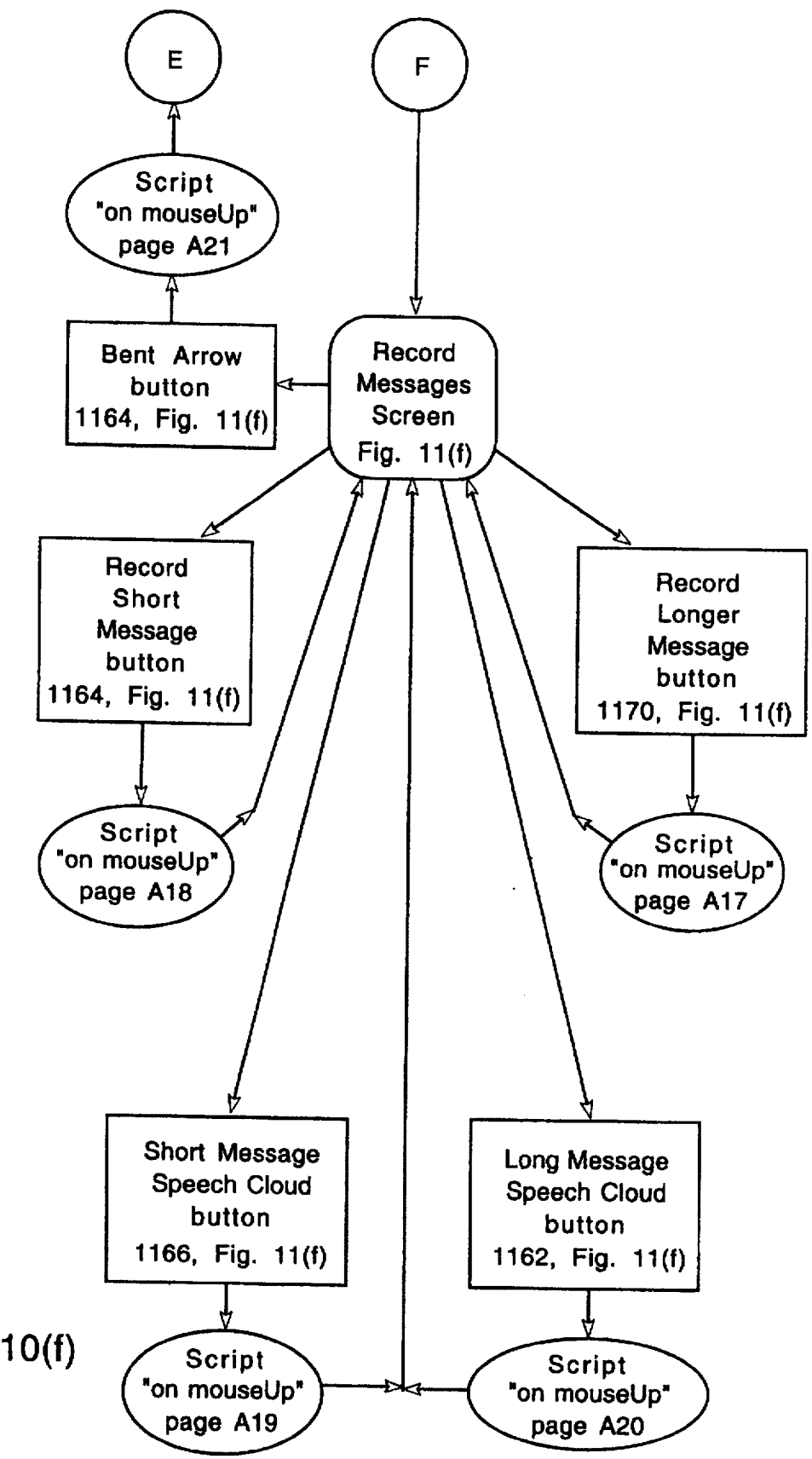

FIG. 9 is a reproduction of a functionality screen for display on a computer monitor of a type which is used to advantage in a diagnostic method utilizing the syllabification of a word in accordance with the present invention. The example shown is for the spelling word "Superintendent" 900. Each button 916–956 causes an action which facilitates the learning process by utilizing combinations of sensory channels. For example, clicking (touch and motion) the "Speaker" 940 button (sight) causes the digitized sound (hearing) of the word to be heard. Clicking on the "Books-on-Shelf" button 920 causes a digitized recording of the word best used in a common sentence. The images on the buttons are representative of the action associated with that button. By holding down certain keys on the keyboard while clicking on some buttons, certain advanced learning concepts are presented. For example, holding the "Command" key down while clicking the "Books-on-Shelf" button 920 causes the spelling rule that controls the word shown on the screen to be heard. Holding the "Option" key down while clicking the "Books-on-Shelf" button 920 causes an alternative sentence using the word to be heard. This sentence conveys, for instance, a different context in which the word is used. Alternative, and less physically demanding, means for accomplishing these described tasks are available for handicapped learners. The use of other buttons are described in the Examples.

Figure 11A:
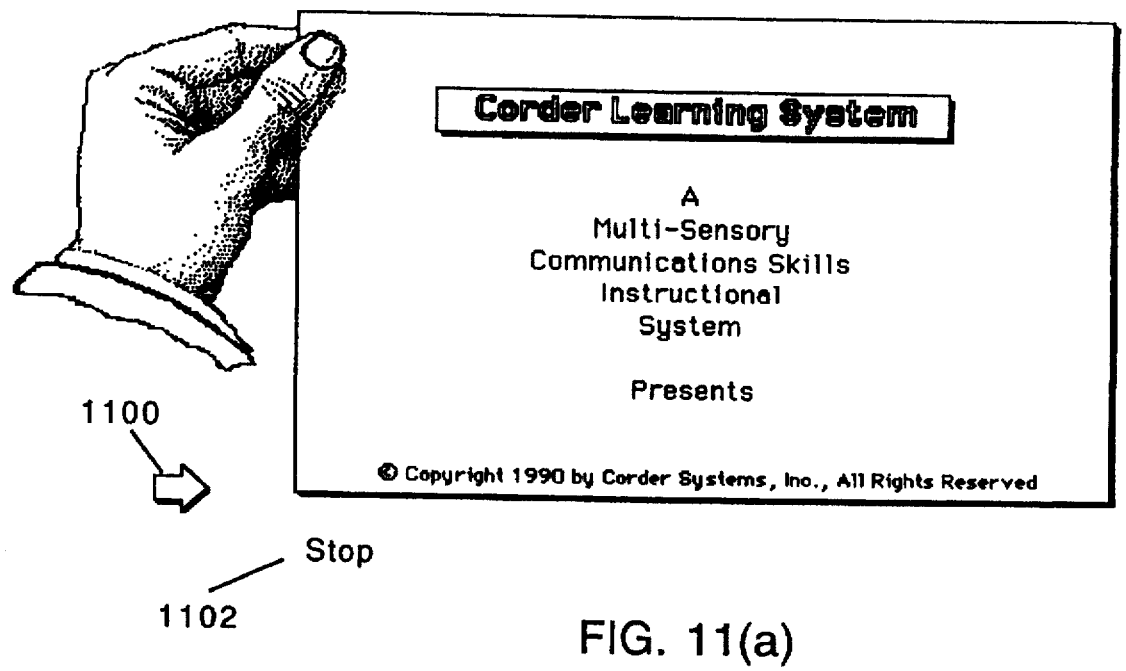
Figure 11B:
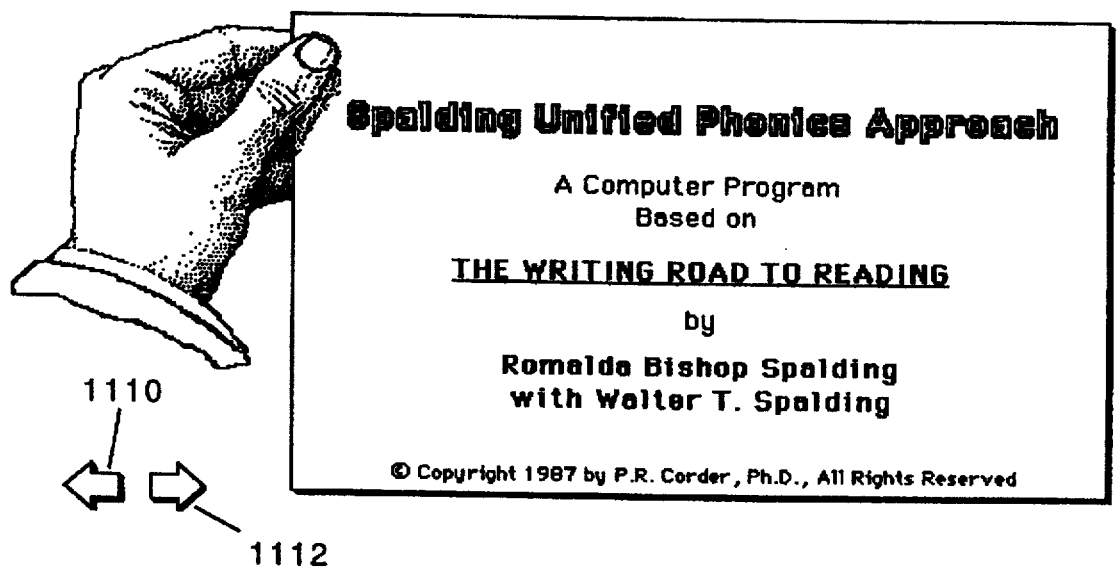
Figure 11C:
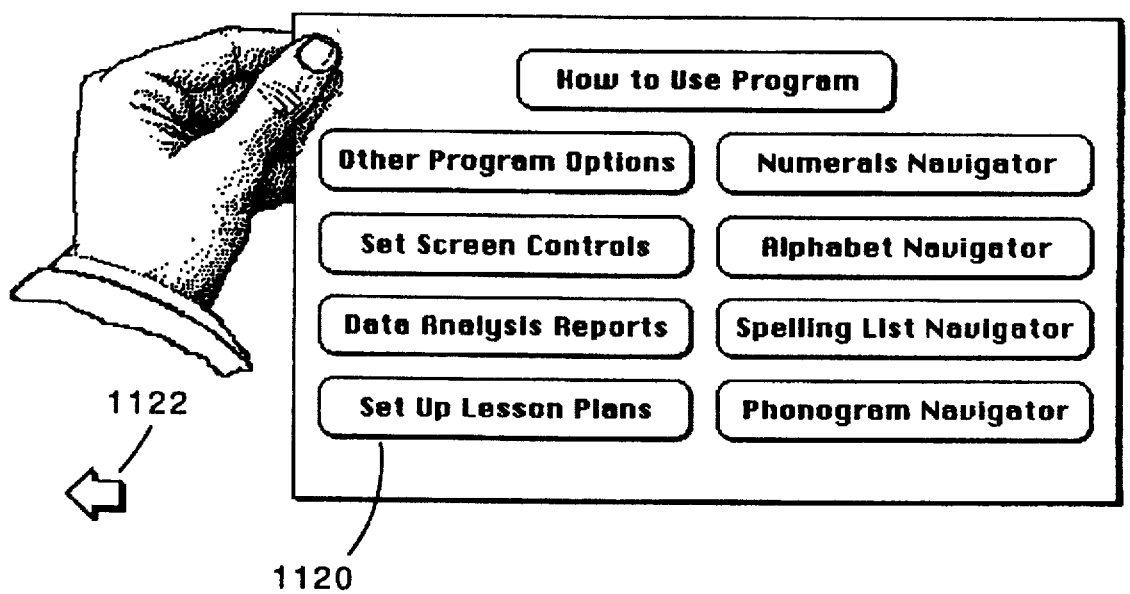
Figure 11D:
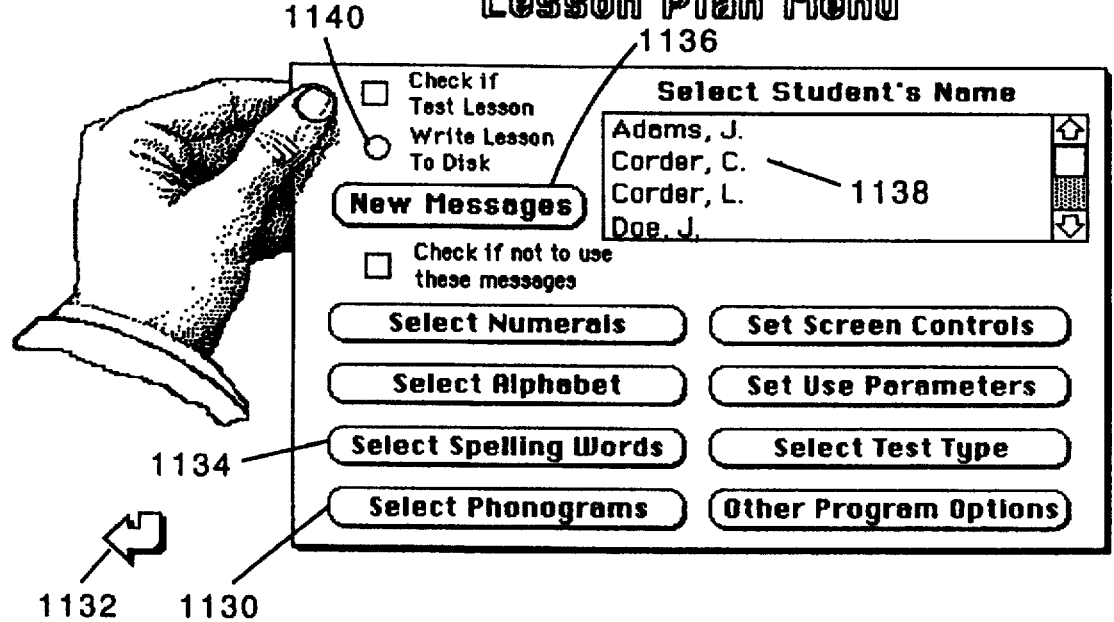
Figure 11E:
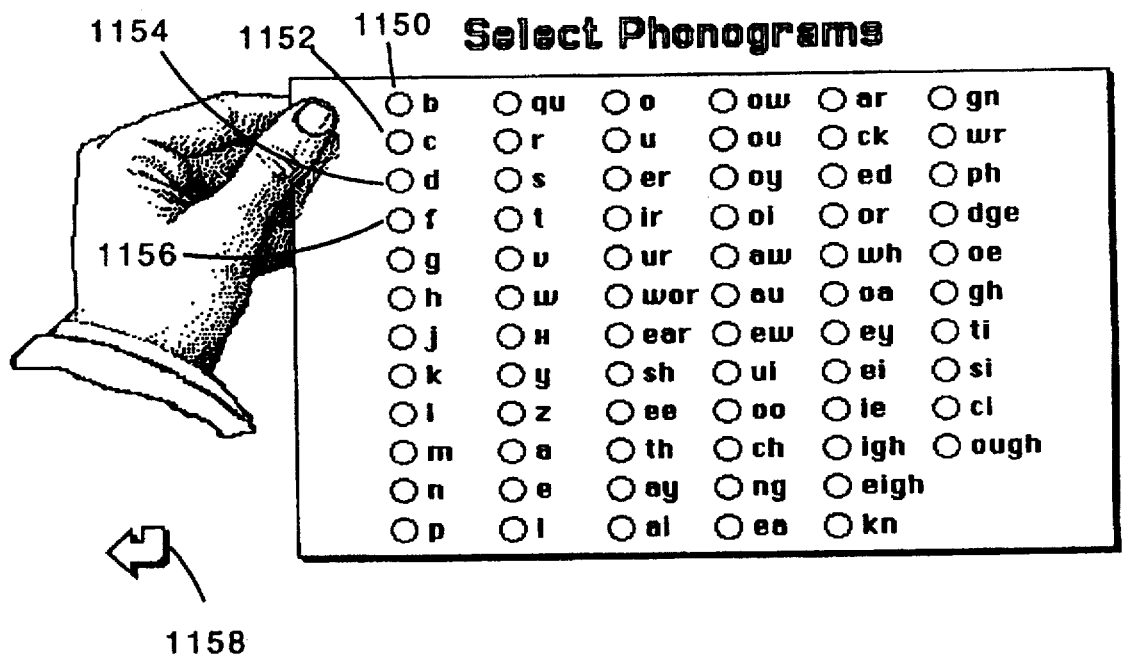
Figure 11F:
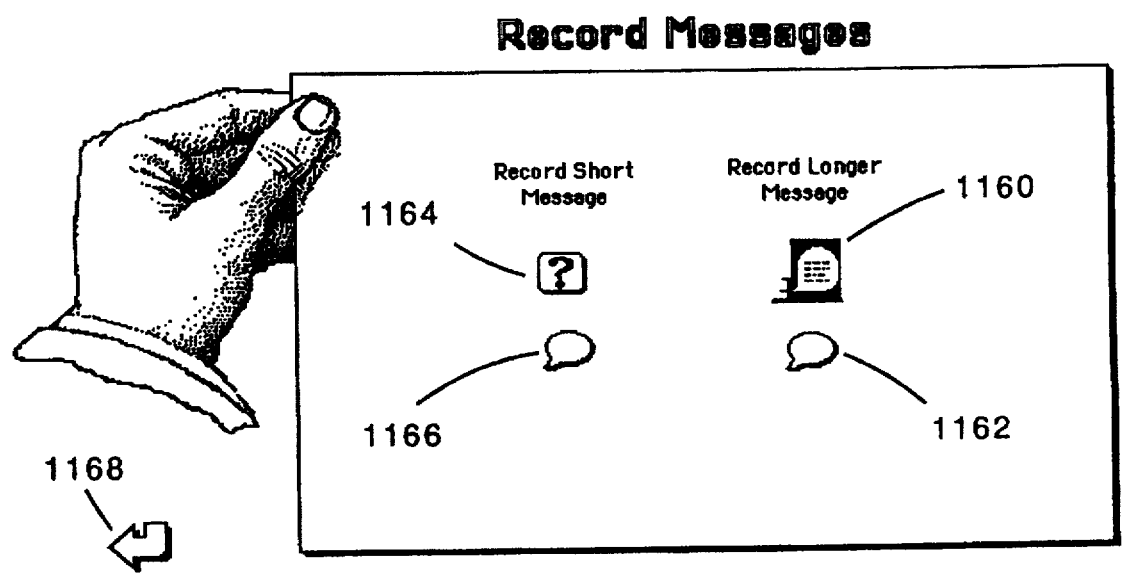
Figure 11G:
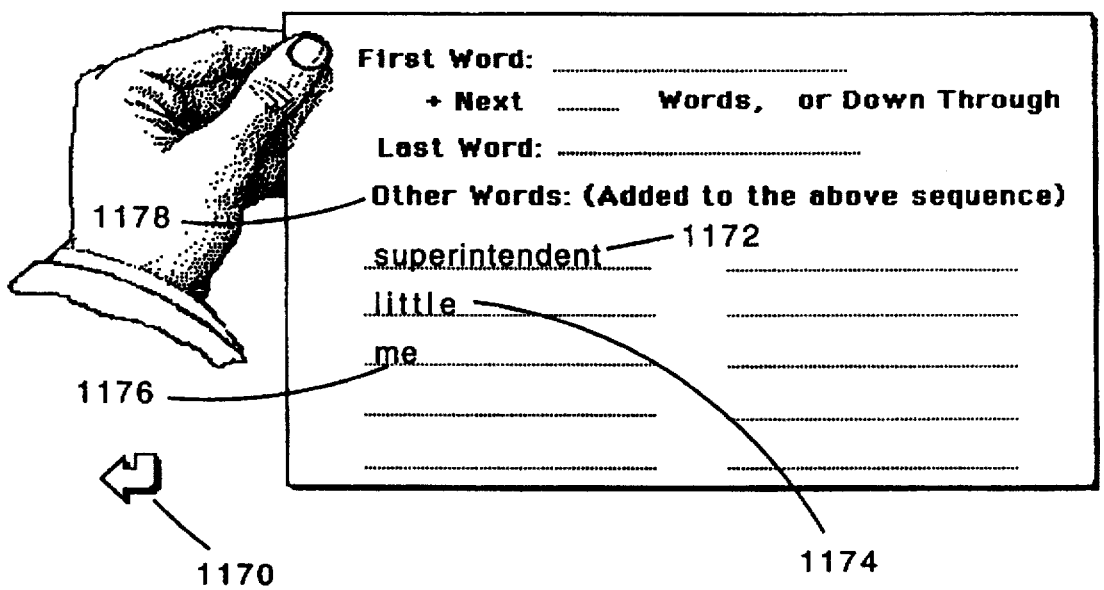

FIGS. 10a–10f provide an overview of the system software structure and organization. A pattern is provided in the figures for understanding the actions described. The system screens are in bold curved boxes, buttons are in square boxes, and scripts are in dashed ellipses. Scripts in the preferred embodiment are preprogrammed segments of code which are executed when specified by the passage of messages by HYPERCARD™. Scripts are not accessible to the teacher or learner. If the learner places the cursor over a button, say the "Right Arrow" button in FIG. 11a, and clicks, then HYPERCARD™ sends a "mouse up" message through the program hierarchy. The button where the click occurs interprets the message as determined by the script of card button id 5 listed on page A3. To facilitate understanding the unstructured organization of this HYPERCARD™ version of the method of the present invention, the name of the script and its location are provided within each of these boxes.

FIGS. 11a–11g display screens contained in the system software. These screens are discussed in the Examples.

Figure 4:
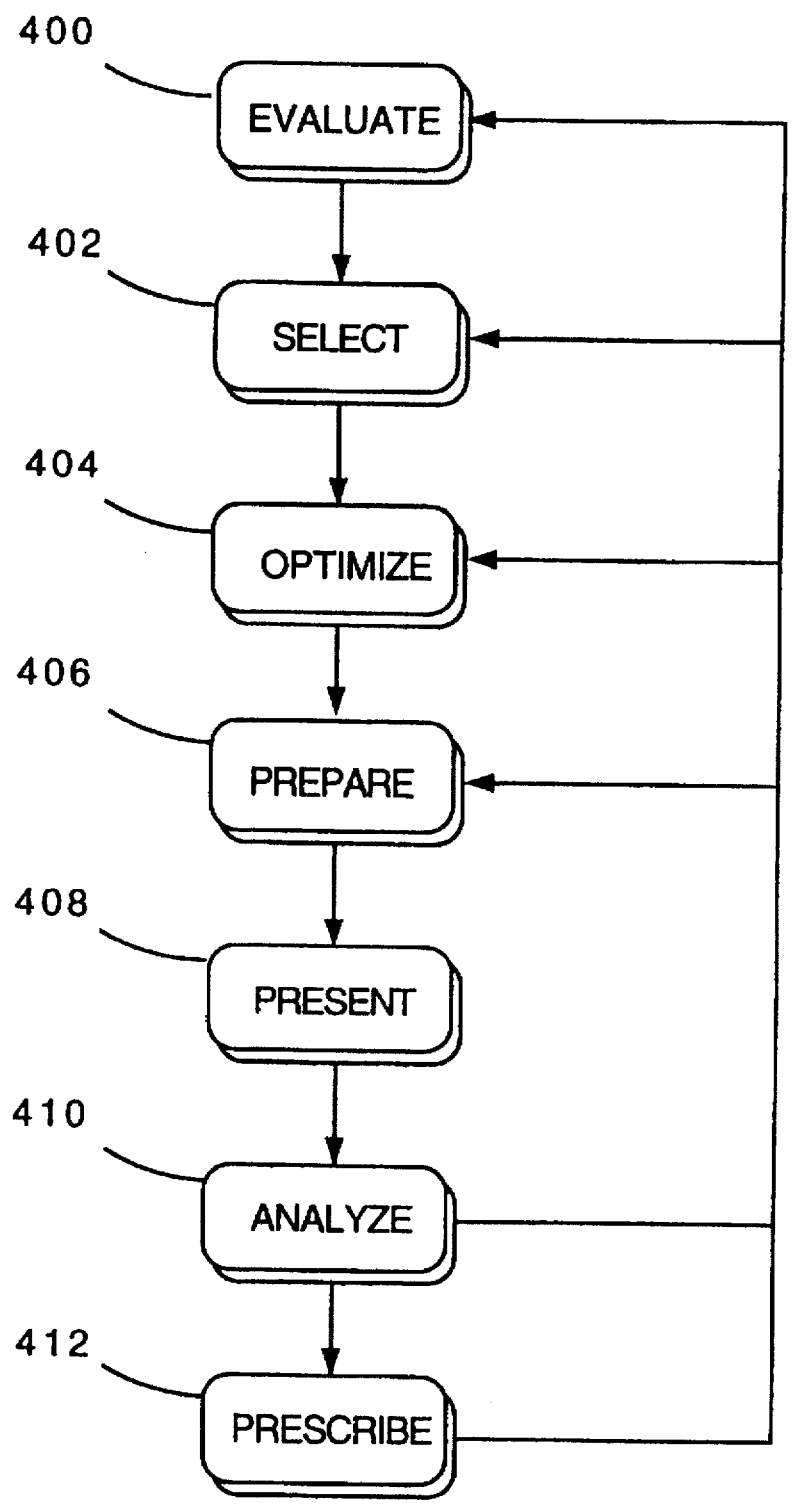
FIG. 4 is a flow chart showing the steps of a presently preferred embodiment of the method of the present invention; the figure also sets out the program logical sequence of the software described herein. The teacher has the option of using her training and experience to bypass the EVALUATE 400, SELECT 402, OPTIMIZE 404, ANALYZE 410, and PRESCRIBE 412 elements if desired. An alternative preprogrammed guide is available to the teacher.
Figure 5:
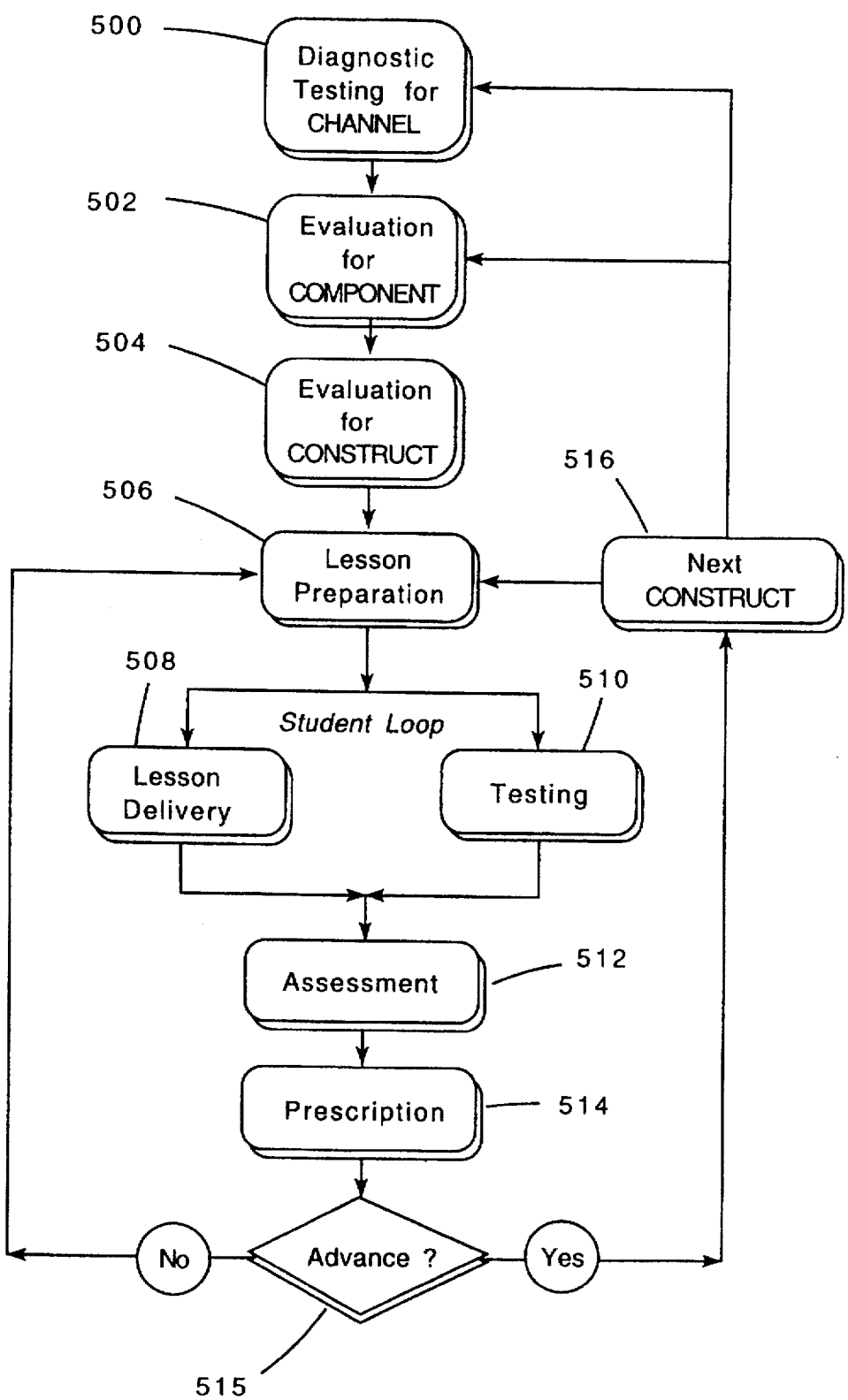
FIG. 5 is an expanded form of FIG. 4. It shows the two paths 508–510 available to the teacher for presenting or testing understanding of the material. The preparation step 506 is defined in more detail in FIG. 6d.
Figure 6A:
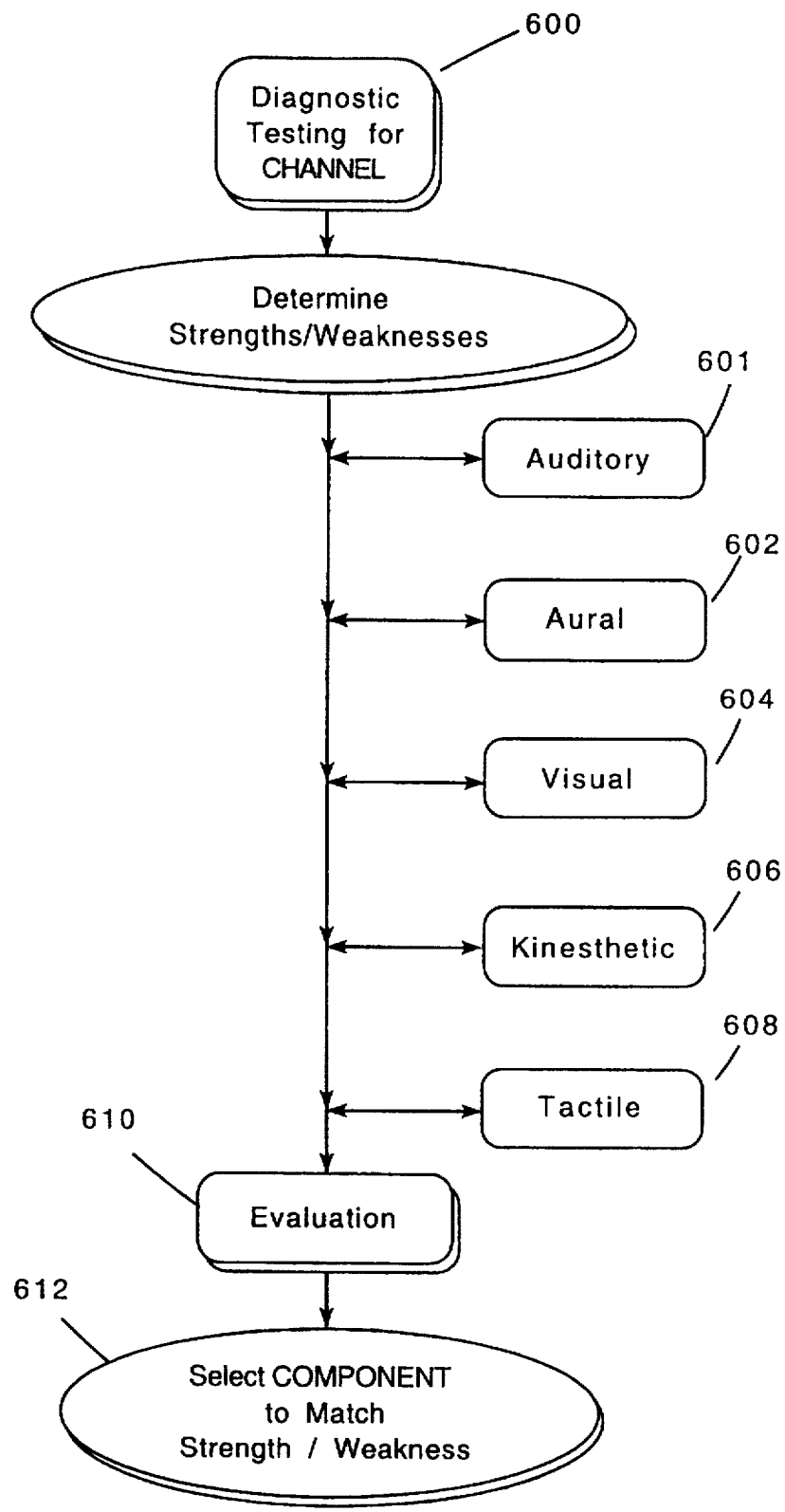
FIGS. 6a–6d provide additional detail for the steps of the method set out in FIG. 4.
Figure 6B:
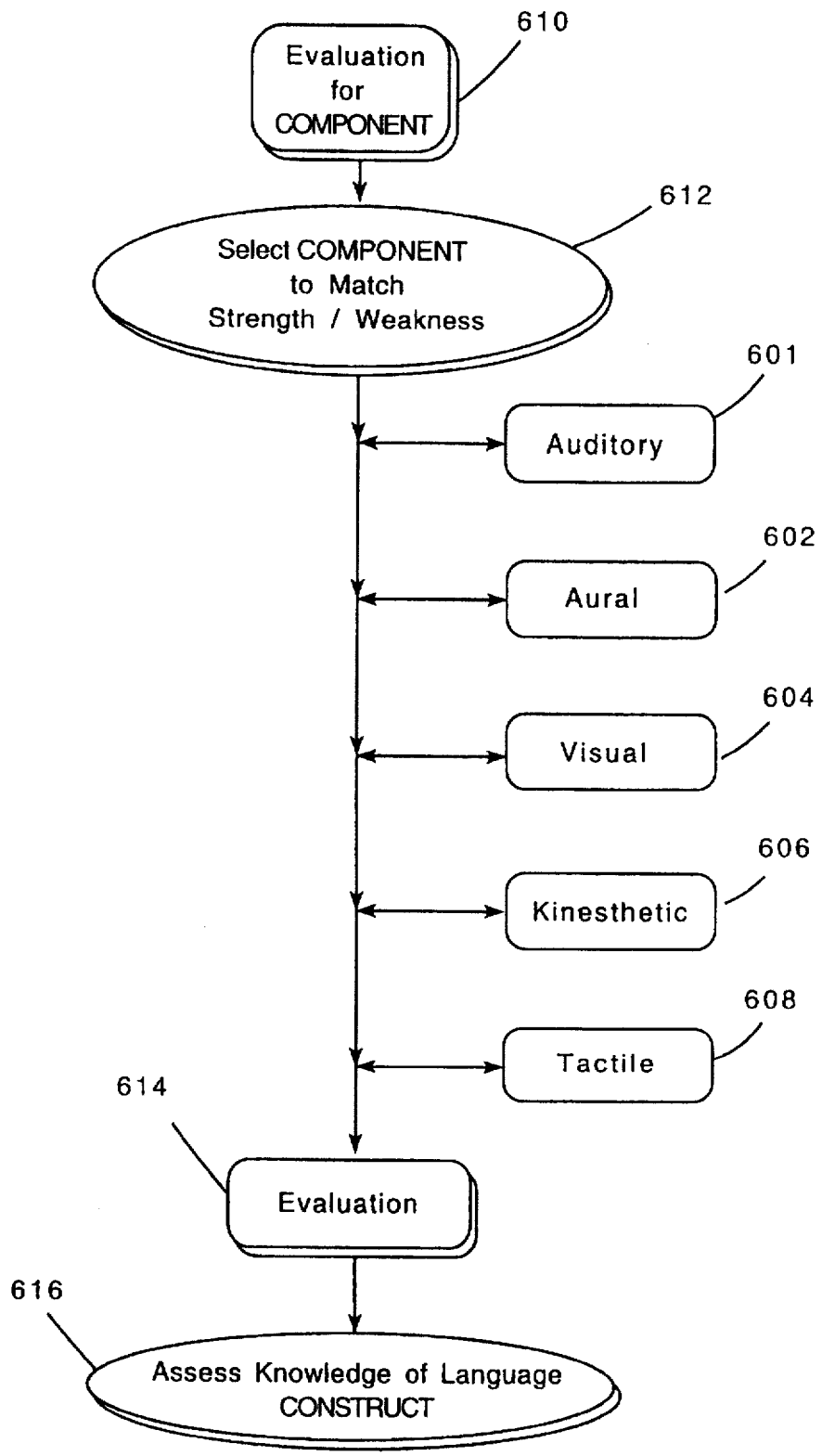
Figure 6C:
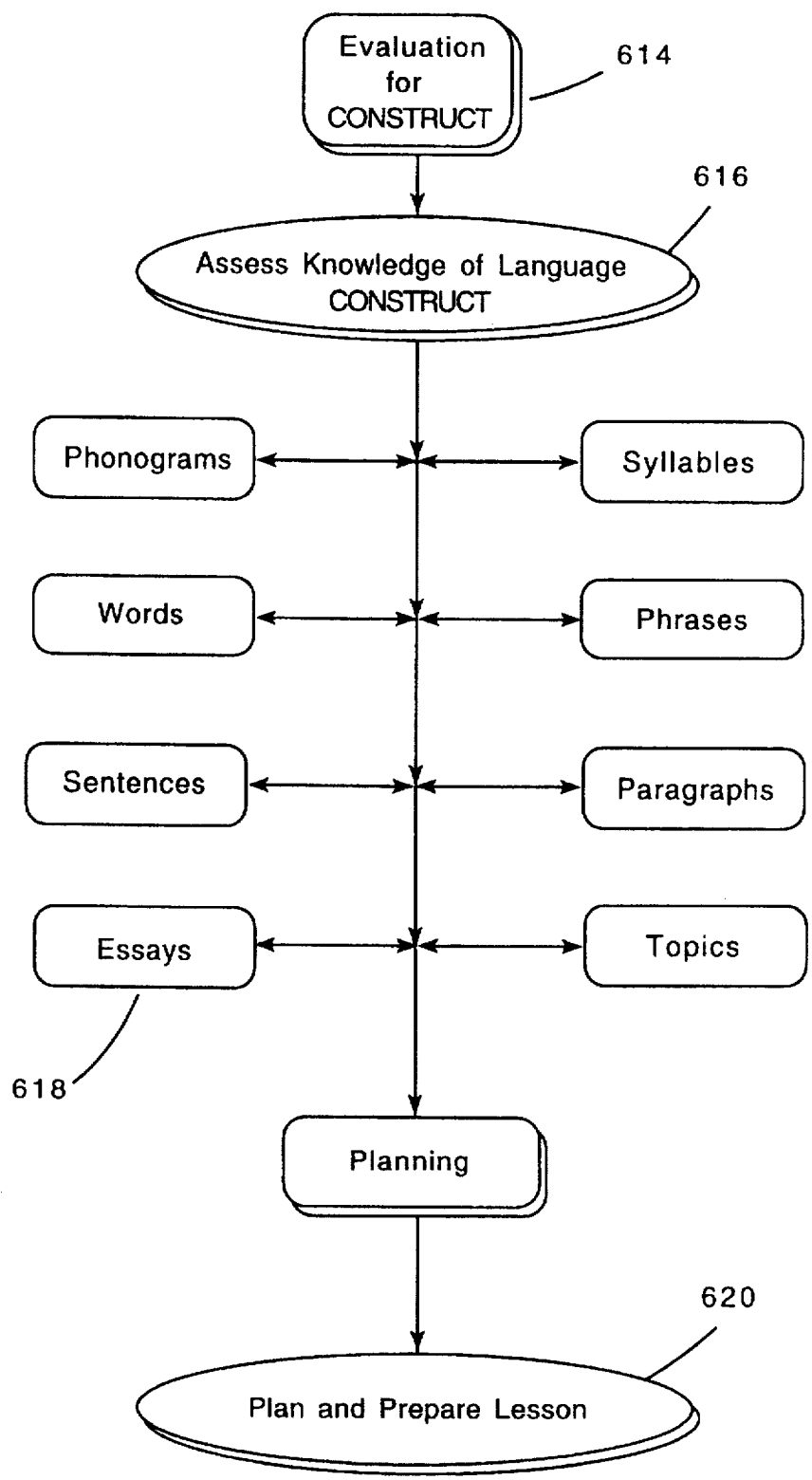
Figure 6D:
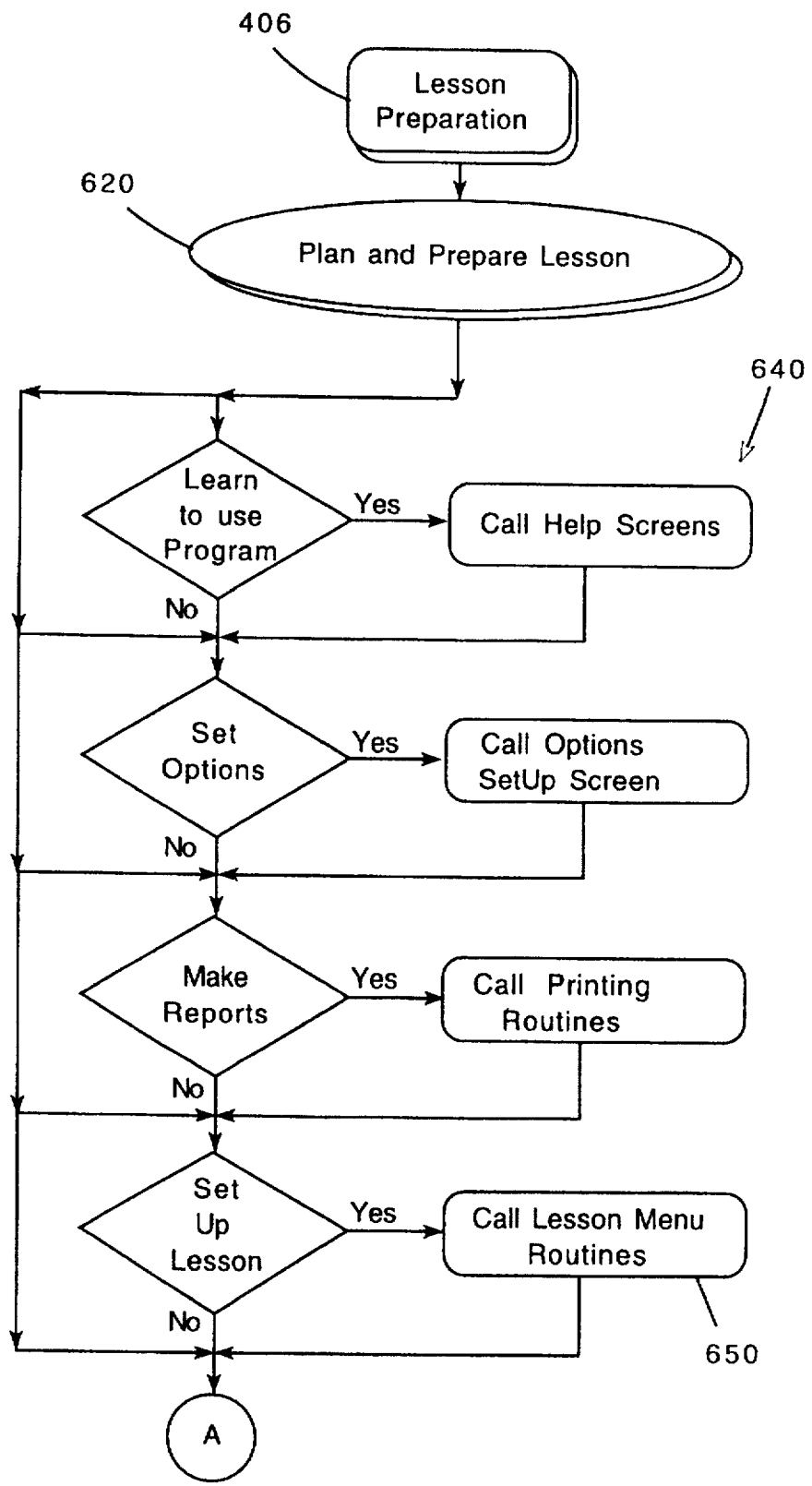
Figure 6E:
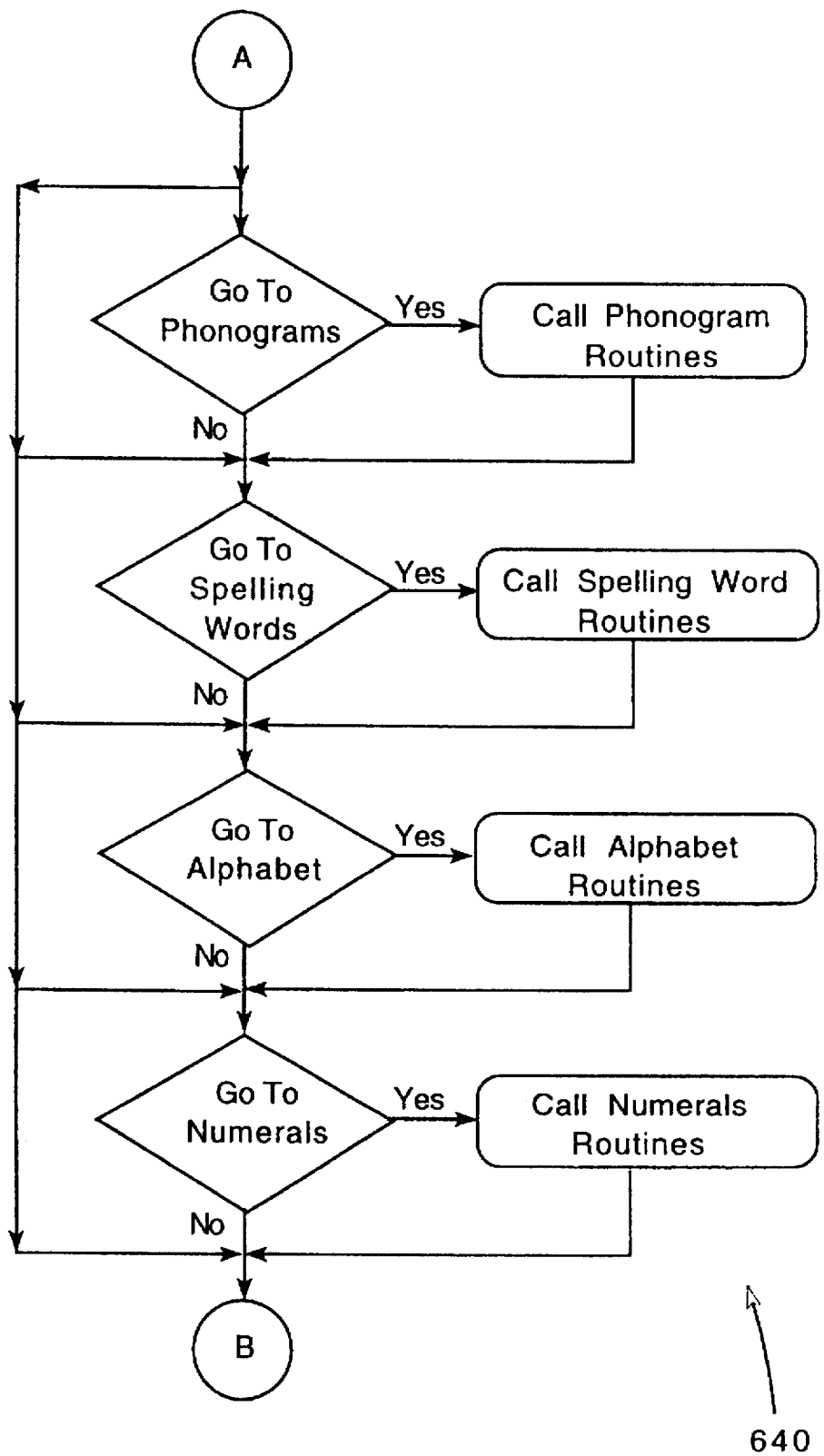
Figure 6F:
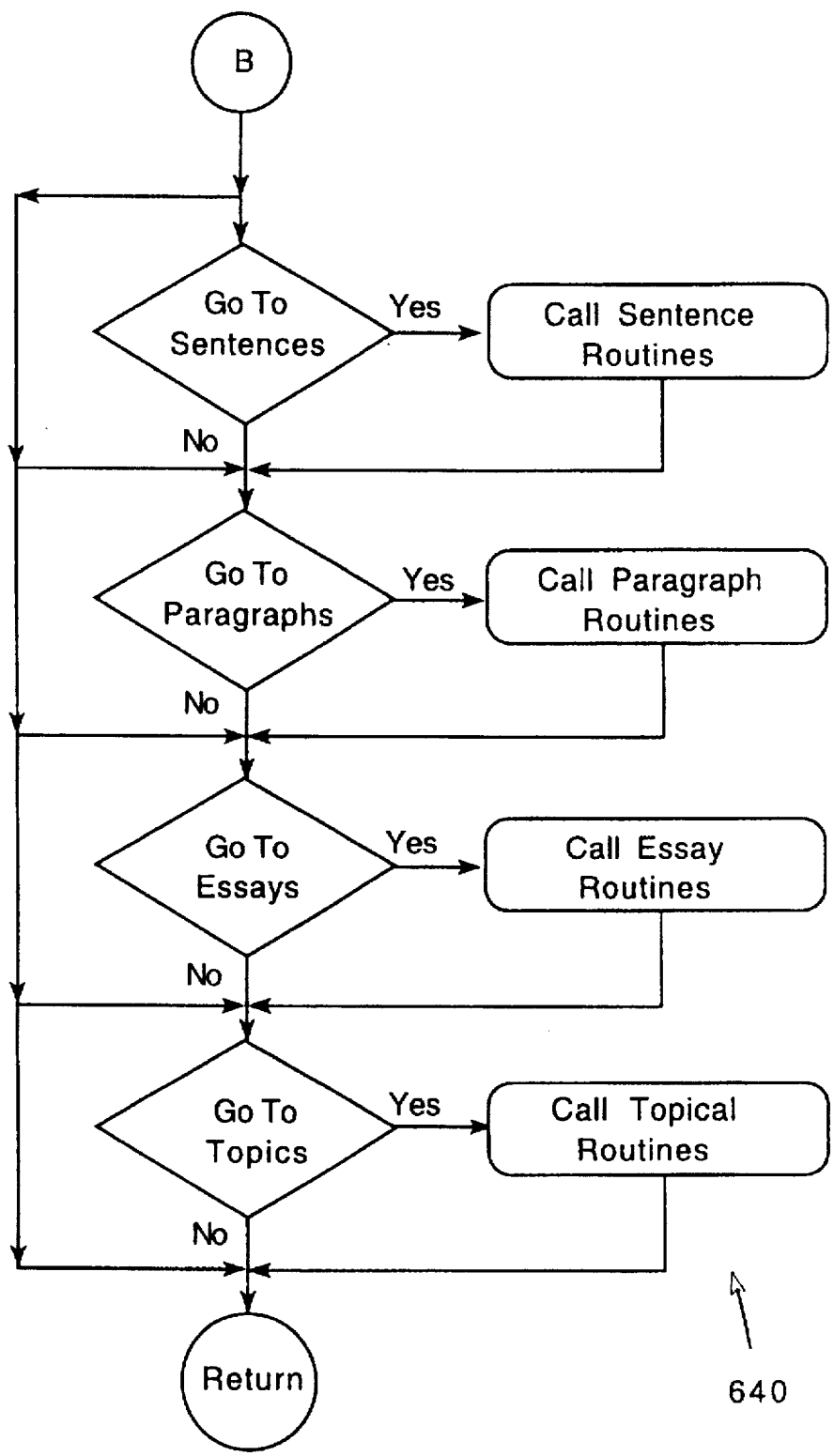
Figure 6G:
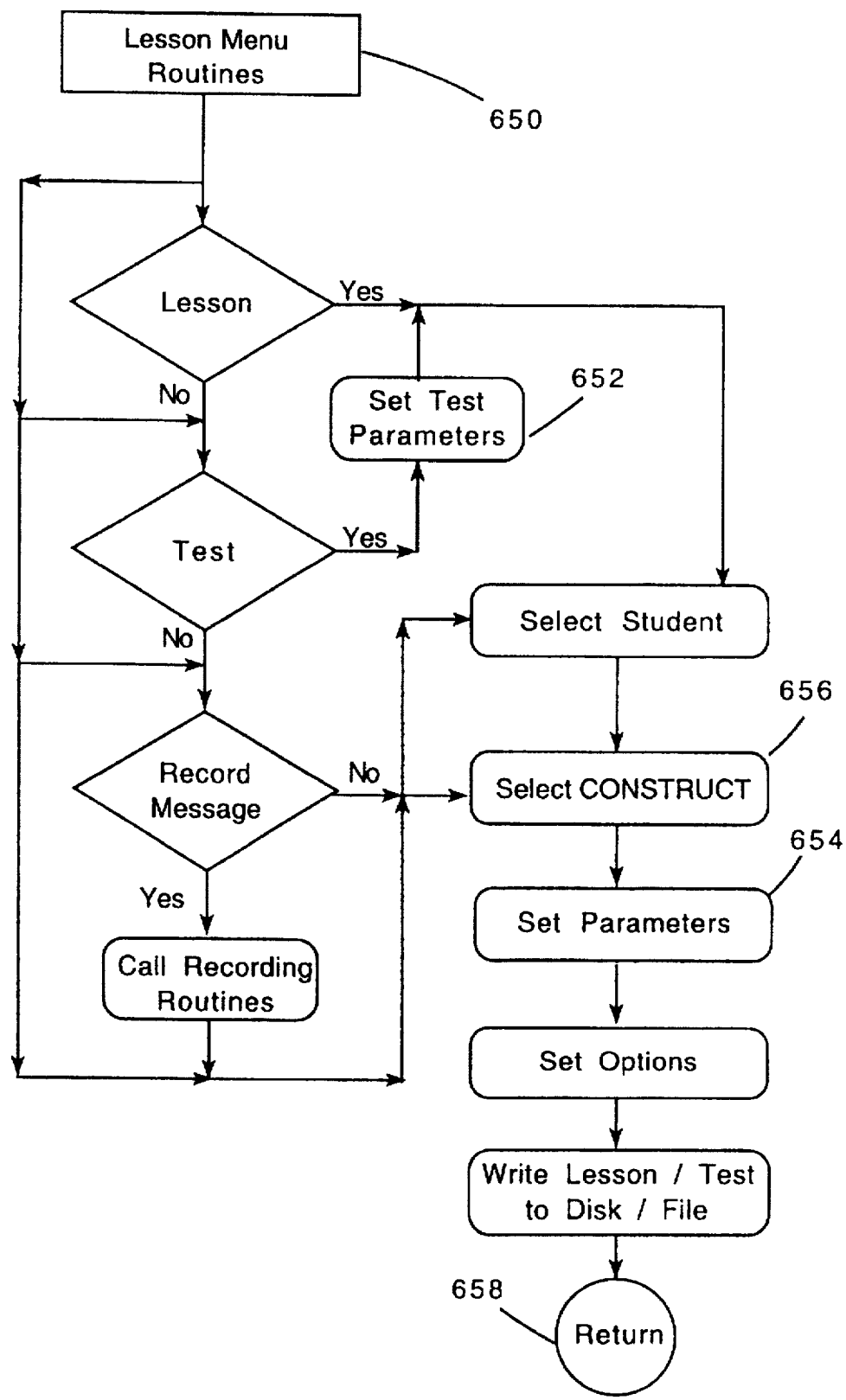
Figure 7A:
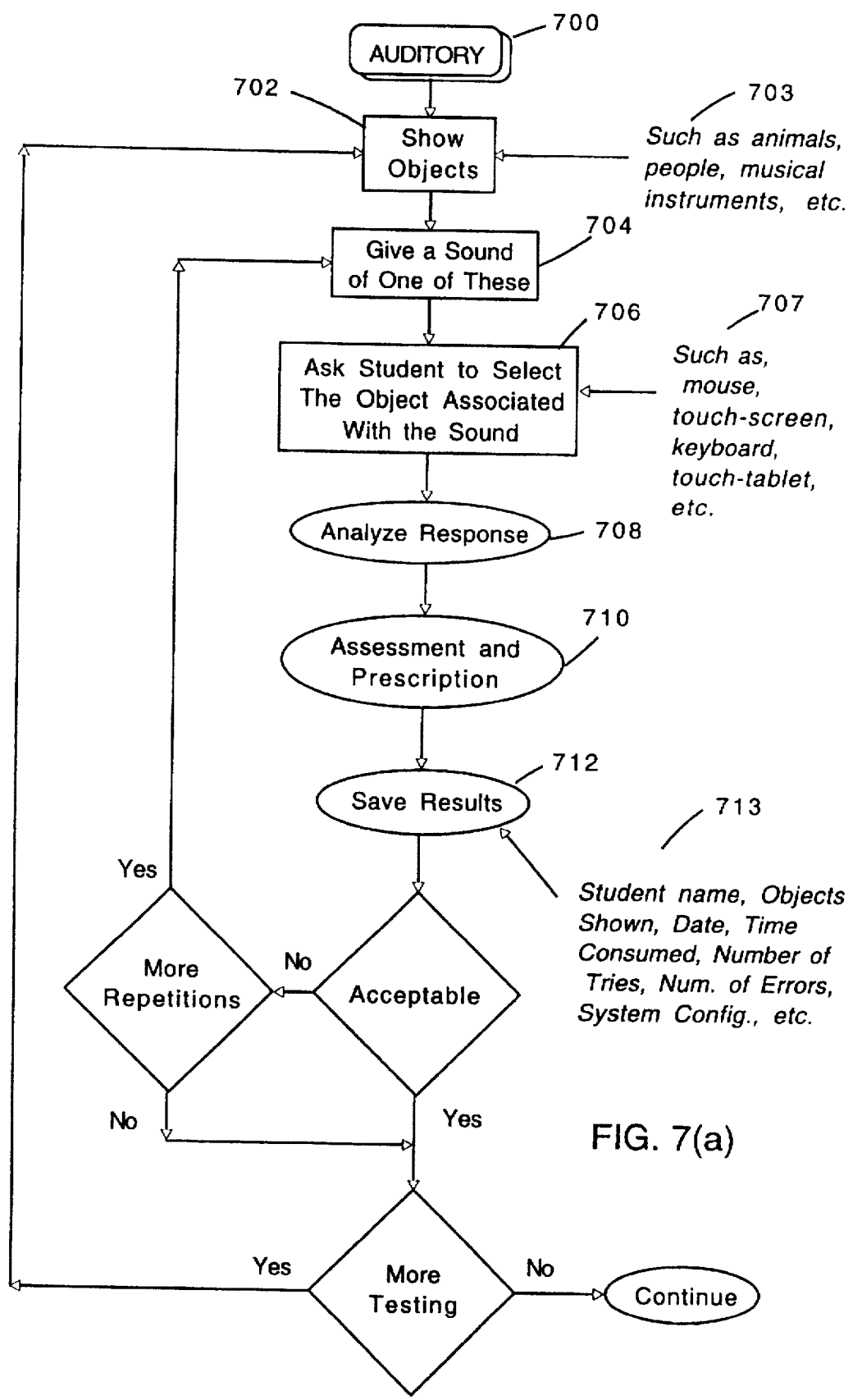
FIGS. 7a–7d provide a summary of the steps involved when each of the four CHANNELS OF LEARNING of sound, sight, speech, and movement are utilized in accordance with the method of FIG. 4.
Figure 7B:
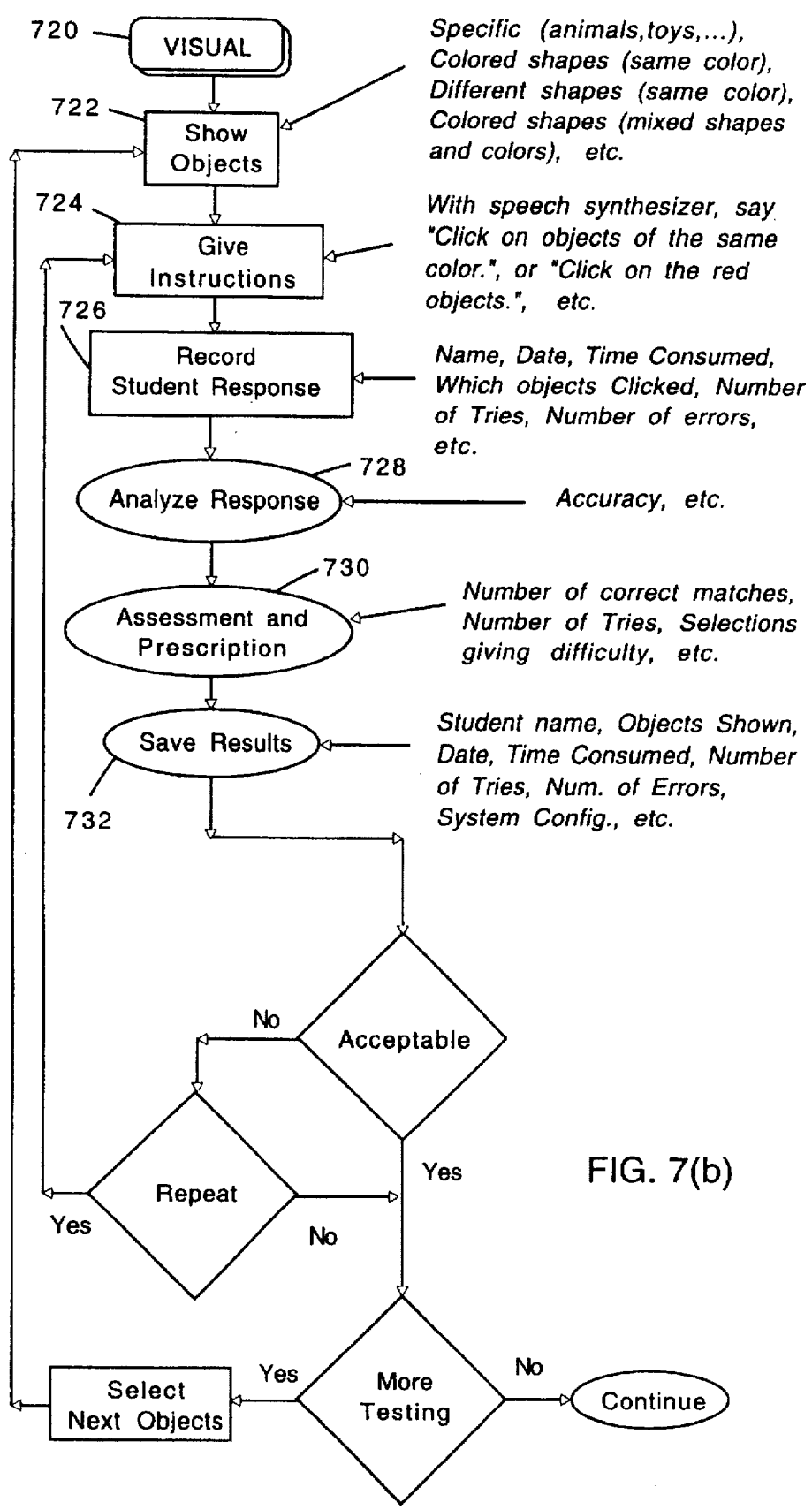
Figure 7C:
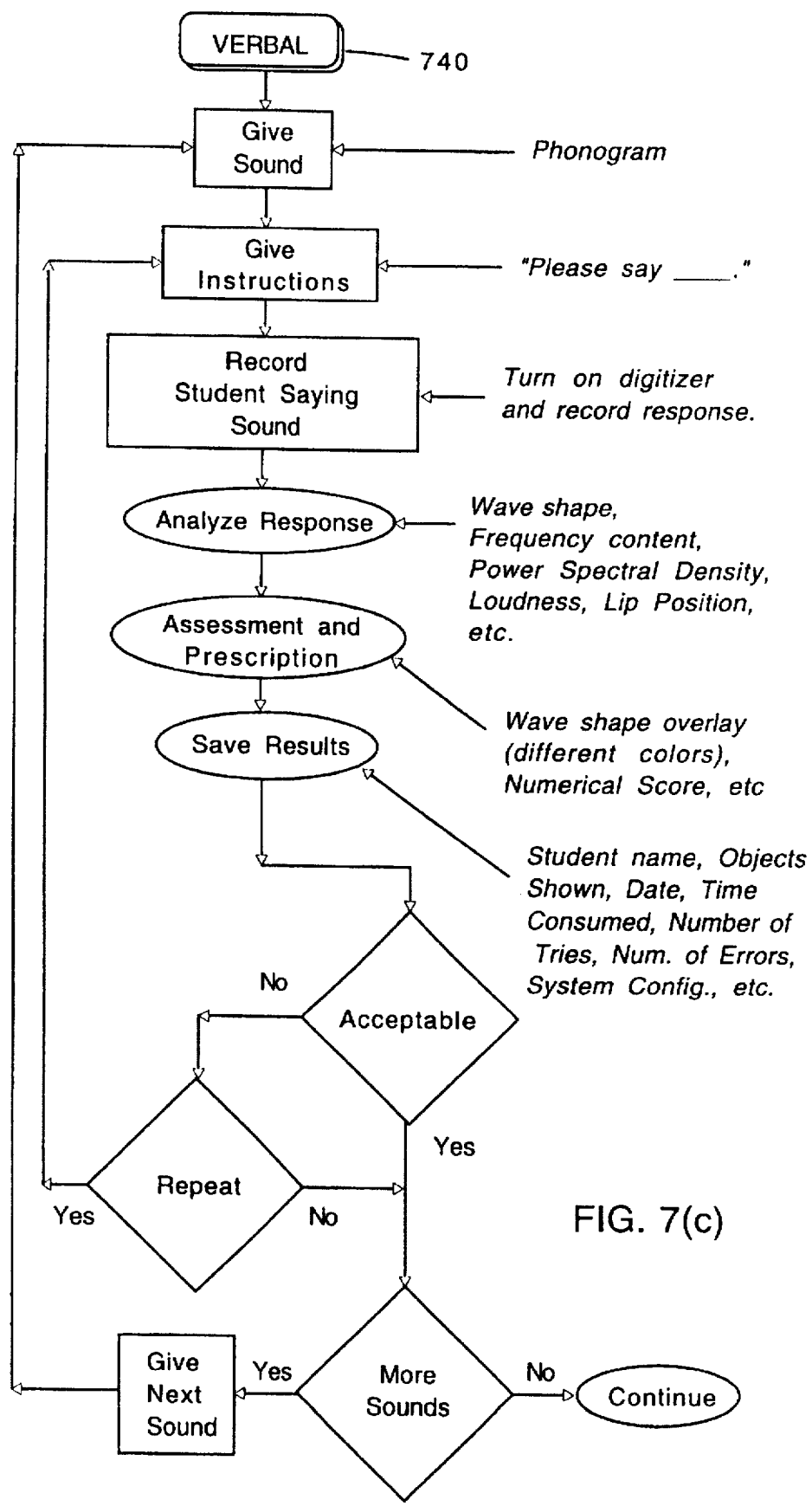
Figure 7D:
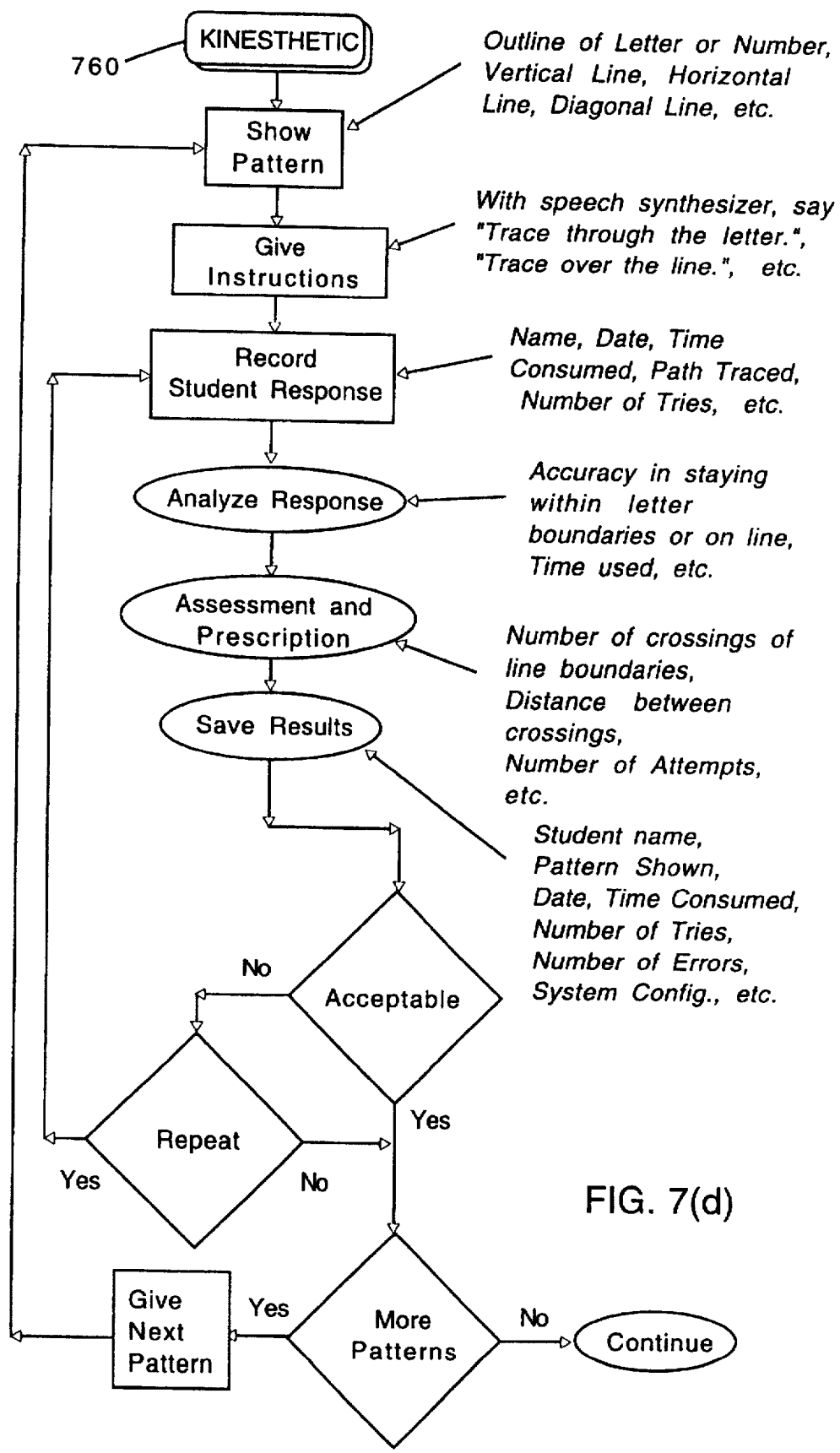
Figure 8:
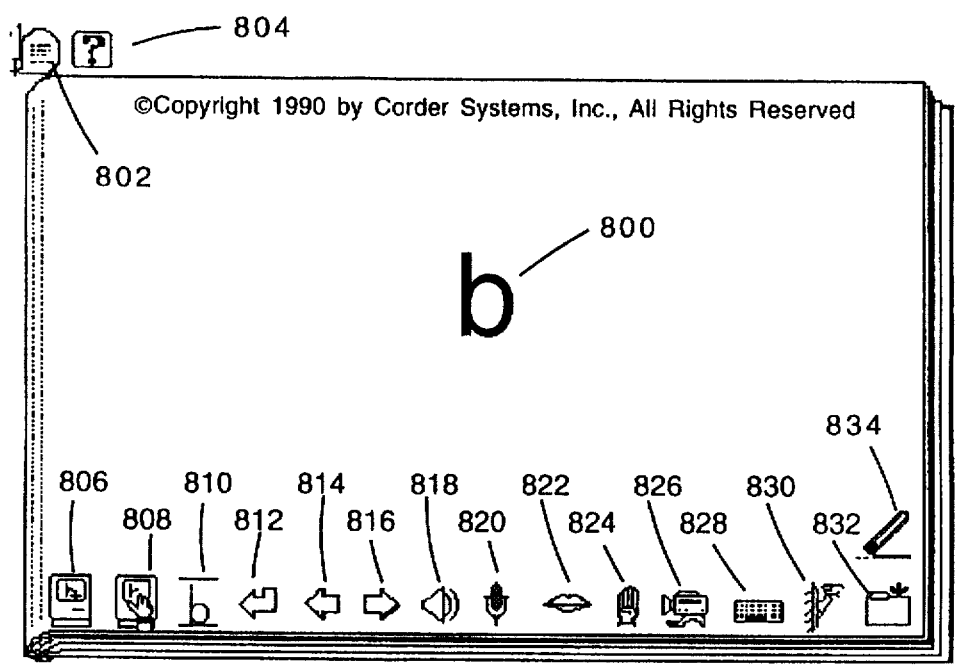
FIG. 8 is a reproduction of a functionality screen for display on a computer monitor of a type which is used to advantage in utilizing phonograms in a diagnostic method in accordance with the present invention. The first phonogram presented is the letter "b" 800. Each icon, or button, 802–834 causes an action which facilitates the learning process. For example, clicking the "speaker" 818 button causes the digitized sound of the phonogram to be heard.

FIG. 12 is a table setting out criterion, or decision, reference rules used in the EVALUATE module 400 (FIG. 4).

DETAILED DESCRIPTION OF THE PREFERRED EMBODIMENT

As used herein, the term "teaching" refers to a sequence of instructions involving developing instructional patterns or lessons, delivery of the instruction, evaluation of the student response and formation of recommendations for continuing the instruction for each student based on that student's learning style, capabilities and disabilities, if any.

As used herein, the term "teacher" refers to the person who is supervising the use of the method of the present invention. This person might be a traditional classroom teacher, a private tutor, or a parent. it could also refer to a therapist who is working to rehabilitate a particular deficiency in the ability of a student to learn using a particular sensory channel(s). The method described herein is unique in that it is characterized by a high degree of flexibility such that it can be used in, for instance, special education classrooms with certain adaptions in the system controlled human interfaces to match the computer to the sensory channel capabilities of each student. For example, an electromechanical device such as a graphics tablet can be interfaced with the computer so that a physically handicapped student, who might have difficulty operating a mouse, can interact with the computer software, thus accessing the lessons determined to be needed.

A principal application of the method of the present invention is to diagnose and remedy deficiencies in the communication skills necessary for use of the English language, however, the method is not limited to English and may be utilized with any language. The presently preferred embodiment of the invention utilizes the so-called "Spalding method" for teaching English as described in Spalding, R. B. and W. T., *The Writing Road to Reading, A Modern Method of Phonics for Teaching Children to Read*, William Morrow & Co., New York, N.Y. (1957), but is not limited to this approach or language.

The method provides an opportunity and mechanisms for the student to repeatedly exercise the functions of the computer, each repetition of which reinforces the learning process. For example, and as will be described, there are no artificial limits on the number of times the student can hear the sound(s) associated with the symbols presented on the computer monitor.

The method of the present invention also provides for the student to learn new facts from diverse subject matter, such as the rules of grammar, the history of the language being studied, or nature facts such as how tigers hunt and the bone structure of a bird, while undergoing the process of diagnosis and remediation of deficiencies in communication skills. Initially, facts of the language, such as the rules which govern spelling, are learned in the process of learning sound/symbol relationships and how these relationships are used in the preferred embodiment to build syllables, words, sentences, and thus, essays by holding down the "Option" key on the computer keyboard while using the mouse to place the cursor over the "Books-on-Shelf" icon (item 920 in FIG. 9) and clicking the mouse button. Here, "clicking" means using the mouse to position the screen cursor over the "Books-on-Shelf" icon 920 then depressing and releasing, or clicking, the mouse button. This icon, or picture, is associated with the button containing the referenced script. Generally, clicking means positioning over a chosen icon, or selected screen element, and clicking the mouse button to signal initiation of an action associated with the icon or selected screen element. The cursor may also be moved using the arrow keys on the keyboard. There are also additional means for indicating action initiation equivalent to clicking the mouse button. Clicking the "Books-on-Shelf" button 920 causes a common sentence using the word shown on the screen to be spoken by the computer. Other features of the language, such as punctuation and grammar, are incorporated into the lessons as appropriate by holding down the "Option" and "Command" keys on the keyboard while using the mouse to place the cursor over the "Books-on-Shelf" icon 920 (see FIG. 9) and clicking the mouse button. The method of the present invention also provides features whereby the student gains proficiency in advanced communication skills, such as how to take notes.

The method provides immediate feedback on the correct response expected. For example, if the instructional objective is to remedy deficiencies in, for instance, the attention span of the student, hearing, motor skills, or other communication skills, one approach might be to teach the student how to take notes during a lecture on the benefits to the general public of the space station program. The student's typed "notes" are analyzed by the system and feedback is provided to the student in several forms. One such form is a recommended set of notes for the lecture. Another is an analysis of the notes made by the student with respect to their completeness and relevance to the topic.

The method of the present invention also provides functions for easing the teacher's work load. For instance, upon command the method is capable of producing student use reports about the exercises and storing the data for use in both monitoring the progress of the student and in mastering new target objectives.

Figure 3:
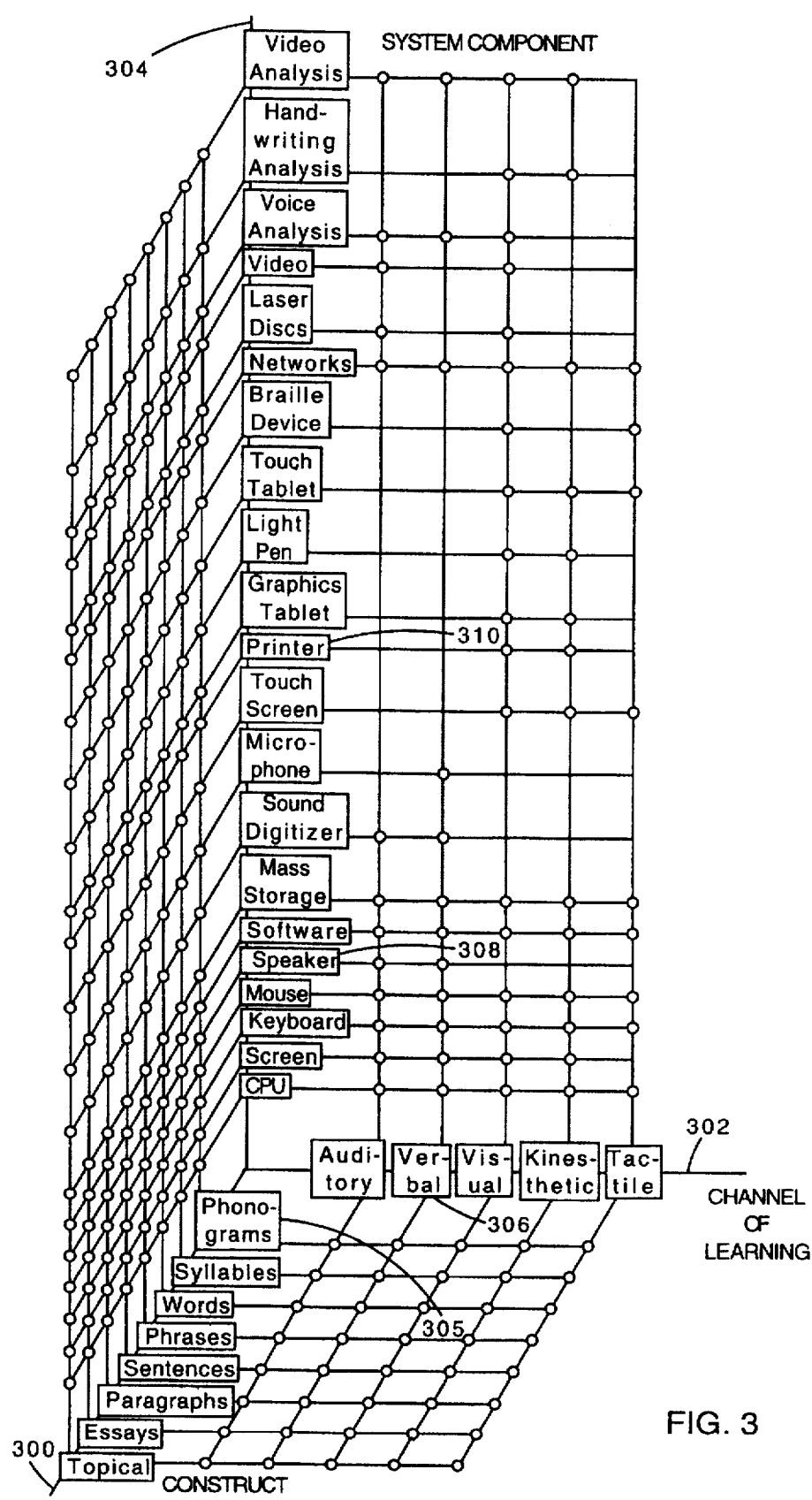
FIG. 3 is a three-dimensional depiction of the various combinations of hardware, target objectives/constructs, and channels of learning which can be utilized in accordance with the method of the present invention. The circles at the intersections of the grids depict the possible combinations of system elements. For example, the Verbal 306 CHANNEL OF LEARNING makes use of a speaker 308, but not a printer 310. Any CONSTRUCT 300 is used in all CHANNELS OF LEARNING 302. Any SYSTEM COMPONENT 304 is used with all CONSTRUCTS 300. Not all SYSTEM COMPONENTS 304 are used in every CHANNEL OF LEARNING 302.

A principal construct utilized for diagnosis and remedation by the method of the present invention is the presentation of letters or combinations of letters in phonograms, e.g., symbols representing the sound(s) of a language (see FIG. 3). These phonograms 305 are used to form syllables and words and, thus, to teach spelling and sentence formation. There are seventy primary phonograms (and several secondary phonograms) of the Spalding method for teaching the English language contemplated by the method of the present invention. The primary phonograms are frequency-of-use dependent, and are listed in the order in which they are introduced when the Spalding method is utilized:

b, c, d, f, g, h, j, k, l, m, n, p, qu, r, s, t, v, w, x, y, z, a, e, i, o, u, er, ir, ur, wor, ear, sh, ee, th, ay, ai, ow, ou, oy, oi, aw, au, ew, ui, oo, ch, ng, ea, ar, ck, ed, or, wh, oa, ey, ei, ie, igh, eigh, kn, gn, wr, ph, dge, oe, gh, ti, si, ci, ough.

Of course, as noted above, the method is not limited to use of only the phonograms of the Spalding method, or for that matter, even to phonograms for use in the English language.

Using the phonograms and the method of the present invention, the student learns to associate the sounds of the English language (or any other language) with their written symbols. They learn to write these phonograms, as well as to recognize, or read, them. The brain is actively engaged in the direction of the hand in producing the symbols, thus achieving the reinforcing benefit of the kinesthetic action of writing. In this manner, the student develops a set of communication skills for use in connection with each of the sensory channels in which deficiencies are diagnosed in accordance with the present invention.

It is recognized that each student employs these mental and physical tools differently in his learning process. Consequently, extensive flexibility is provided by the method to meet this need. A diagnostic test is administered to every student using the system. The test uses simple learning tasks and evaluation of each student's stimulus/response patterns to establish optimal cognitive learning modes. The teacher uses this information in combination with knowledge of the student's age and ability to determine lesson plans for the student. In the absence of a teacher, an alternative guideline based on the diagnostic test is used.

The rules of the language are introduced as they are needed to explain correct spelling and grammar. Simple sentences conveying meaningful truths and concepts are used to demonstrate the word in a sentence. Examples of such sentences are (the spelling words are underlined):

You are a fine person.

We stand for the Pledge of Allegiance.

Laughter cures many ills.

An isthmus connects two islands.

It is one objective of the method of the present invention to preserve and promote simplicity and directness. Although the teacher has control of the lesson, the attention of the student is held by providing him with control of the flow of his lesson and by allowing learning by discovery through the unstructured use of screen buttons. By clicking on the appropriate control icons at the bottom of the computer screen, he can, for instance, hear the sounds of the phonograms selected from the lesson set and shown on the screen, have the phonogram drawn in real-time, or have lines upon which the letter(s) of the phonogram are written or drawn (in proportion to how they would appear on ruled paper) drawn or removed. In each instance, the sound of the phonogram (or spelling word) is heard. Other icons may be selected as is appropriate, such as recording his pronunciation of the phonogram (or spelling word) and immediately being able to hear his voice from the computer upon clicking the screen button associated with this activity. Accuracy is obtained by comparing this recording with the previously recorded standard sound for that phonogram (or spelling word).

The method of the present invention includes the ability to capture a student's performance. These data are date-stamped and timed, as appropriate, and available to the teacher for evaluation of progress over time. Besides providing actual use data, the method analyzes the data and suggests what needs to be done in a later session on the computer. The organization and structure of the method thus allows for prescribed, self-directed usage.

Figure 1:
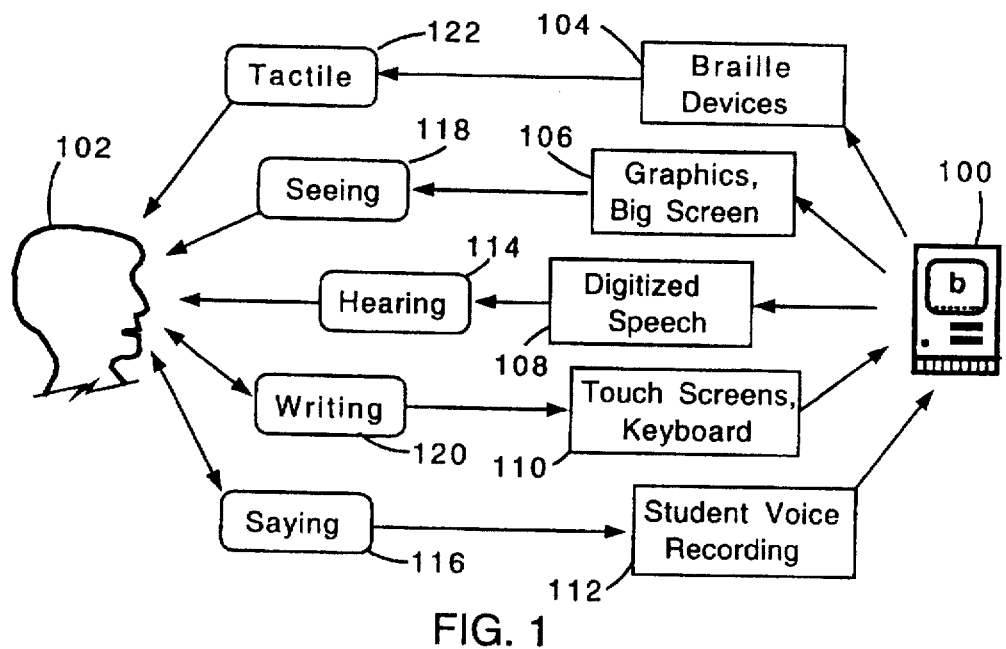
FIG. 1 is a schematic representation of the various interfaces incorporated into the method of the present invention. The independent channels of learning 114–122 are facilitated by computer components 100 and 104–112. These components are only a few among many possible combinations.

The methodology used in the present invention is based on combining the five independent CHANNELS OF LEARNING 114–122 and the components 104–112 of the computer based diagnostic system, see FIG. 1, into an almost unlimited number of cognitive strategies so as to provide an optimal strategy for remediating a deficiency in the communication skills of the student. The strategies are composed by the system using information stored about each student's learning capabilities and styles. As shown schematically in FIG. 1, the learning channels by which computer 100 and student 102 interact (through the respective SYSTEM COMPONENTS 104–112 listed in FIG. 1) are the aural 114, the oral 116, the visual 118, the kinesthetic 120 (e.g., typing, writing, or hand signing), and tactile 122 (as when the unsighted learner uses electronic braille devices as a substitute for the visual channel of learning). The teacher is not required, a priori, to determine which combination represents the optimal cognitive strategy for a given student. Instead, a preliminary evaluation of the student's skills is conducted using computer-generated stimuli requiring a response from the student and the above-described stored data, if any, indicating the student's previous performance(s). A person might have a deficiency in one particular sensory or motor learning channel, for example, vision. In this case, one or more of the student's other learning channels become intertwined and form new ways of learning. In the process, weak channels become stronger through being involved, even if in a limited way, with the learning activity. Handicapped students deprived of one or more channels can still learn through compensatory mechanisms.

Figure 2A:
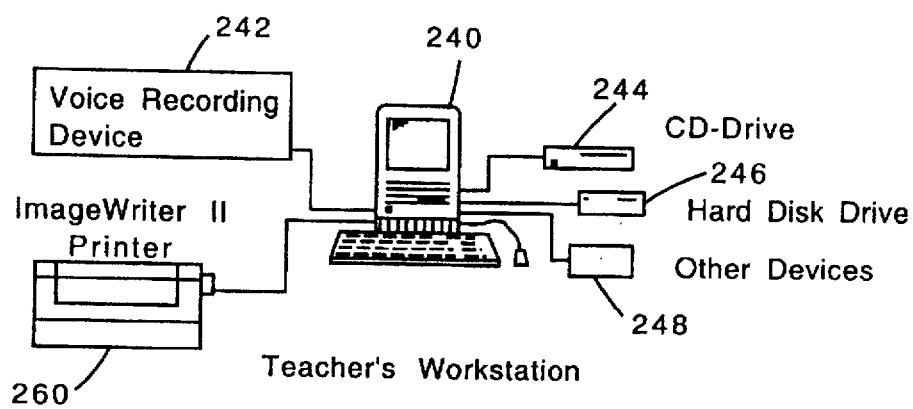
FIG. 2a is a schematic representation of a teacher's computer 240 or workstation. This system configuration normally has more hardware components than the student's system. "Other Devices" 248 refers to components available to the teacher, such as touch screens, track balls, etc.
Figure 2B:
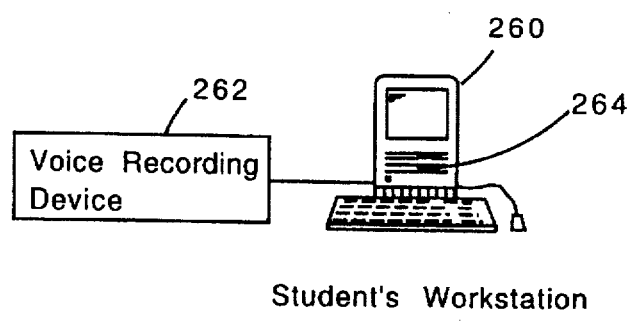
FIG. 2b shows a student's computer 260. Component 262 is included to digitally record the student's speech and the figure depicts the simplest system hardware configuration from among an almost unlimited number of possibilities. A typical networked computer lab having various hardware components which might be utilized to advantage with the method of the present invention is shown in FIG. 2c. Also shown in this figure are several hardware components which facilitate the teaching of communication skills. For example, the video camera 208 provides for the assessment of the lip positions during speech, or in the case of a deaf leaner, for recording and evaluating the student signing the lesson objective. The current invention is not limited to particular computers or system configurations.
Figure 2C:
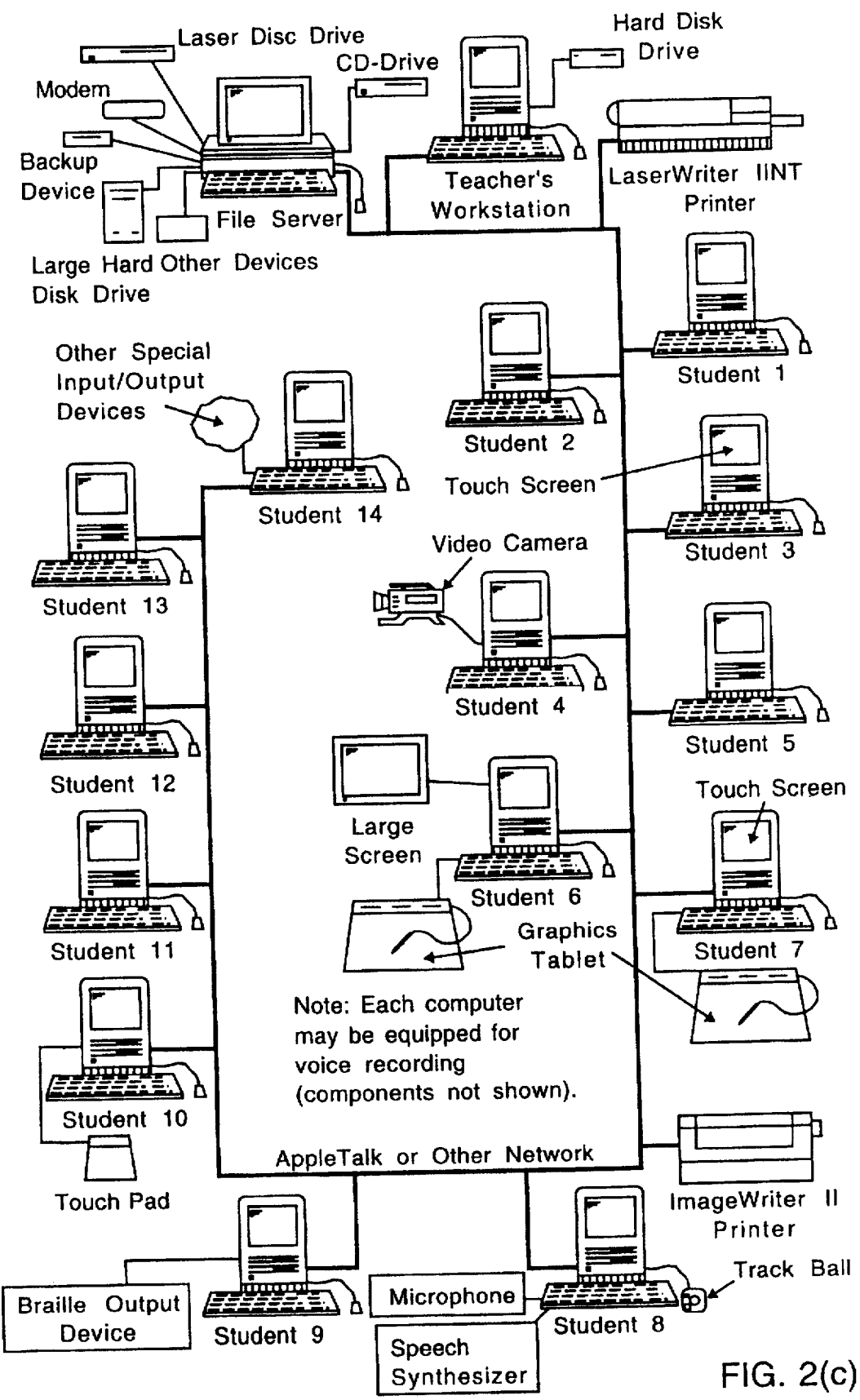

The five independent CHANNELS OF LEARNING 114–122 incorporated in the methodology of the present invention utilize computer components, see FIGS. 2a–2c. Outside of classrooms, the system configuration will most likely be that shown in FIGS. 2a–2b. Some SYSTEM COMPONENTS, such as track balls and voice recording devices, are not shown for clarity. In some cases the system in FIG. 2a may serve both the teacher and student, as in the case of private use of the methodology of the present invention in the home.

Many installations involve multiple users, such as in a classroom. While not required, classroom users may use networked SYSTEM COMPONENTS, as in FIG. 2c. In the preferred embodiment described herein, Apple MACINTOSH™ computers using HYPERCARD™ are utilized as both teacher computer 200, 201 or 240 and student computers 202–228 and 260, but the method may be implemented on equivalent computer platforms with equivalent capabilities and different operating systems. For single user installations, see FIGS. 2a–2b, the following is a preferred configuration of a system involving phonograms and spelling words; any component has one or more equivalents:

Teacher's Computer:
    Apple MACINTOSH™ SE/30 40HD 240
    Apple External Hard Disk 80SC (or higher) 246
    CD-ROM Drive 244
    Apple IMAGEWRITER™ II Printer 260
    Farallon MACRECORDER™ Sound Digitizer and Software 242
    Other Devices 248, such as track balls, etc.

Student's Computer:
    Apple MACINTOSH™ Classic or LC 260
    At least two disk drives 264
    Farallon MACRECORDER™ Sound Digitizer and Software 262

For classroom use, a possible network installation for use in accordance with the method of the present invention is shown in FIG. 2c. In the preferred embodiment, each student's computer 202–228 has at least two disk drives, one to hold HYPERCARD™ and the other the individualized lesson disk. Hard disks may be added if storage requirements for the lessons become too great. In the following list, the preferred system is described in terms of the equipment required for a system having the capability of utilizing phonograms and spelling words; any component has one or more equivalents:

Teacher's Computer:
    Apple MACINTOSH™ II 160HD, or
    Apple MACINTOSH™ SE/30 160HD
    Apple External Hard Disk 400SC (or higher)
    CD-ROM Drive
    Apple LASERWRITER™ Printer
    Farallon MACRECORDER™ Sound Digitizer and Software Student's Computer:
    Apple MACINTOSH™ Classic or LC
    Two disk drives
    Farallon MACRECORDER™ Sound Digitizer and Software
    Apple IMAGEWRITER™ II Printer An alternative system configuration is:
    Apple MACINTOSH™ II (or equivalent or higher)
    Apple Internal 1 GB Hard Disk (or higher)
    Apple LASERWRITER™ Printer
    CD-ROM Drive
    Modem
    BackUp Device
    Laser Disc Drive
    Other Devices, such as track balls
    Farallon MACRECORDER™ Sound Digitizer and Software
    National Instruments (for Apple MACINTOSH™) NB-A2100, Audio Frequency Analog I/0 Board
    LABVIEW2 Software System The number of student computers is varied as is needed. Each is preferably provided with a set of headphones with a built-in-boom mike (not shown). Other headphone/ microphone combinations are also possible. The headphones are plugged into the back of the computer so that the student can hear the lesson without disturbing the rest of the class; however, the mike jack is plugged into the sound sampling plug or into the sound digitizer if a separate unit is used. Each computer need not be equipped with the same peripherals. Only those interfaces that are required for the target student population need to be considered.

The method of the present invention is capable of taking a student who does not read because of, for instance, a visual impairment, all the way through to a skilled user of a language able to assimilate information and express ideas and concepts. As described above, after preliminary evaluation, numerous approaches may be taken to reach that objective based on the needs of the student and the hardware components available. The large number of approaches is depicted in FIG. 3. As shown in FIG. 3, the method embodies three major facets, namely, CONSTRUCTS, SYSTEM COMPONENTS, and CHANNELS OF LEARNING.

The CONSTRUCT axis 300 takes the student from Letters (Phonograms) to Syllables to Words to Phrases to Sentences to Paragraphs to Essays to Topical material. This is the language content axis. The CHANNEL OF LEARNING axis 302 embodies the independent avenues of learning that are available to the student using the method of the present invention. These channels include the Auditory, Verbal, Visual (unreadable, of course, to the hypothetical visually-impaired student described above), Kinesthetic, and Tactile channels of learning. This is the personal capability axis.

The SYSTEM COMPONENT axis 304 shown in FIG. 3 includes the hardware components that facilitate the learning process described above. These components can include the CPU, computer screen, keyboard, mouse, speaker, software, mass storage devices, sound digitizer, microphone, touchscreen, printer, graphics tablet, light pen, touch tablet, braille device, network hardware, laser discs and associated playback equipment, video devices, voice analysis hardware and software, speech and sound synthesizers, handwriting analysis hardware and software, and video analysis hardware and software, some of which are depicted in FIG. 2c. This is the physical system axis.

Having described a system including a digital computer 240 having processing, storage, input and output means that is utilized in the method of the present invention, reference is now made to the software run by the computer 240 and shown in FIGS. 4–7 and FIG. 10. As discussed above, the first step in the method of the present invention is the selection of the channel of learning to be tested 500, 600. The teacher uses her experience to specify the communication skill within a given channel which needs to be tested in a particular student. For example, before a student can understand verbal instructions he must be able to hear the words which comprise the instructions. Words themselves are comprised of phonemes, or phonograms. These are the fundamental building block sounds in languages. Thus an initial focus in testing the audio channel of learning 600 is to test whether a student is able to discriminate between individual sounds. One way to test this communications skill is a test of the ability to discriminate between common everyday sounds. A test in this area provides information for determining deficiencies in the auditory channel of learning.

Human experiences can be incorporated into computer-based expert systems making it possible to automatically specify and conduct skills testing within the various channels of learning. This is the evaluation aspect of the method of the present invention. The evaluation module considers all channels in a prescribed sequence. It provides a suggested test specification, but allows the teacher to override the module in whole or in part. Within this module, a test consists of the selected channel of learning, a skills focus within that particular channel which needs to be examined, and the approach to be taken in testing that aspect of that channel. Examples of possible focuses and approaches are identified in the example below. The teacher also determines at this time what user selectable test environment options are to be available to the student during the test. Examples include, but are not limited to, setting the speed at which the numerals and letters are written on the screen, the ability to change the volume of the sounds, and similar options. These variables modify the functionality of the interface between the student and the implementation of the method of the present invention.

In the next step of the method of the present invention, the teacher specifies the test content. A menu is presented from which the channel of learning to be tested is chosen. The choices available to the teacher are depicted at reference numerals 601, 602, 604, 606, and 608 in FIG. 6a. Upon the teacher selecting a channel by clicking on its button, or using the arrow keys in conjunction with the Enter key, the screen is cleared and a new menu is presented which provides a set of focuses for that channel. For each focus listed on this menu, there exist numerous approaches which might be appropriate for the test. A choice of a focus leads to another screen menu from which one of these approaches may be selected. After the teacher selects an approach by clicking on its button, or using the arrow keys in conjunction with the Enter key, an additional menu screen is displayed from which other options may be selected. One option is the extent to which the student will be permitted to set or change certain operational parameters. When finished, the test specification is saved on the memory means. How the teacher specifies a diagnostic test is illustrated in the example below.

The next step in the method of the present invention identifies and extracts 506 the specified material from the storage means 246. Using the test specification, the material stored in the databases is examined to determine what is appropriate for the identified student for the test to be given.

Past performance data is examined to adjust the built-in models for that student. This past data become filters through which current tests are specified. Trend data are useful in providing a basis for increasing the difficulty or complexity of a task on the test. For example, if visual testing had been done using no more than three objects on the screen and trend analysis demonstrated improvements in learning, then four objects could be specified for subsequent tests.

This information on which data to use is assembled and written to a file or disk for later use in giving the test to the student. The material itself can be copied to the test file. An alternative is to write only references or pointers to it.

The next step in the method of the present invention involves the presenting 510 of the test material to the student in the prescribed way. This could be on the same computer as used by the teacher, a remote computer, or one on a network with the teacher's computer. Each scenario requires a different administrative mechanism to accomplish the test.

The first screen presented to the student gives program credits. A second screen permits any user selectable options to be set by the student if allowed by the teacher in the test setup. An example of this is letting the student interactively change the volume level or the screen colors. Changes made by the student are documented and stored to memory since they may contain clues to potential learning deficiencies. Setting test environment options is done on a separate screen. If no options are made available to the student, the test screen is displayed. The material is presented according to the channel being tested, the focus within that channel, the approach within that focus and any teacher or user selected test environment options.

Performance data are collected and saved for later analysis. The software keeps track of such parameters as the student's name, the date and time of the test, how many times each key is pressed or each icon is clicked, how many times the student's response was correct, and similar data. The sequence of the key strokes/mouse clicks is registered. These and other performance data are compiled and saved to the storage means (246 or similar).

The computer accumulates a data base of performance data pertinent to a teacher's understanding the special needs of the student. This compiled and saved performance data permits trend analysis. Trend analysis identifies improvement in the student's performance over time. These improvements modify what and how material is presented to that student in future learning sessions in order that the student is continually challenged to learn.

The method of the present invention continues by analyzing 512 the student's responses to the stimuli presented in the previous step. The decision rules (see FIGS. 12a–12c) are extensively used in this analysis.

Trend analysis identifies areas which need attention from either the teacher or as a result of the analysis For example, either might recognize that a student who does not respond appropriately to sounds containing certain frequencies might have hearing loss in that frequency range. Instructional material should be modified to accommodate this hearing skill deficiency.

Various ways are used to present the captured and compiled data to the teacher. For instance, a copy of the test screen and its icons overlaid with the number of times each is chosen by the student when clicking it with the mouse can be displayed. The data can also be presented in the form of a bar chart showing the number of times each icon or button has been clicked.

An example of this process might be that it is demonstrated over the course of the test of all channels of learning that the student performs best using one or more specific channels. This result is reported to the teacher and used in preparation and presentation of the materials in such a way that the deficient channels contribute to the sensory process so that they may be strengthened in the process of participating.

Since each student learns differently, the method of the present invention is able to identify the preferred channels used by each student. This is done by testing each channel and suggesting procedures and/or computer peripherals which accommodate these preferences and needs. For example, it might be determined that a student responds faster using a graphics tablet having a pen type cursor control device rather than the traditional mouse. This performance trait is reported to the teacher.

Another example would be a student who has problems seeing small letters or numerals. One remediation which is used to advantage in that instance is a large screen and scaled up numbers and letters and other images or objects. The scale factor could be reduced over time based on documented improvement in associated tests. The factor could also be reduced intentionally to challenge the student to improve.

This step in the method of the present invention is therefore characterized as the step of making the suggestion of a remediation procedure appropriate for that student and any recorded past performance and the deficiencies. Initially a default model of a typical student is used to recommend modifications in instructional materials and procedures based on standard approaches to remediating deficiencies. For example, if it were discovered during the testing that the student favored the left half of the screen, then the chosen instructional material to be used is presented in this area of the screen. But over time in subsequent learning sessions, the area would be expanded with more of the screen being used to present the material and solicit responses from the student from the expanded region. For example, the student might be instructed to begin a tracing of the numeral or letter at a point outside the dominant left half. This discussion illustrates the use of the retentivity evaluation criterion listed in FIG. 12a and the "Location on screen" and "Beginning point" comments in the same figure.

The method of the present invention is better understood by reference to the following example. This example is set out herein for purposes of exemplification and is not intended, and should not be construed, so as to limit the scope of the invention.

EXAMPLE 1

In this embodiment of the method of the present invention, the target objective to be achieved is the diagnosis and remediation of a student's ability to discriminate among various environmental sounds. The learning channel to be tested is that of hearing 700.

The computer components utilized are the central processing unit, display screen, keyboard, mouse (or other cursor control device), speaker/sound synthesizer (or other sound output device such as seen for student 14 in FIG. 2c), memory (temporary and/or permanent), sound digitizer (or other sound input device such as a CD-ROM device 244 containing a disk upon which these environmental sounds and other test materials are stored), microphone (or other audio recording device) and the processing means.

Test specification and the performance of the student are documented and used in subsequent testing sessions using the EVALUATE module 400. The teacher can alternatively select an appropriate starting point for the test or the communication skills focus to be tested is selected based on the previous performance of the student. These basic processes are illustrated in this example.

A. How the Teacher Specifies the Diagnostic Test

The process followed by the teacher to conduct a diagnostic test of the auditory discrimination and auditory memory aspects of the auditory channel of learning is depicted in the logic diagrams of FIGS. 4, 5, 6a and 7a. The teacher selects the diagnostic focus of the auditory test or accepts the defaulted focus suggested as a result of previous performance by the student. These focuses include, but are not limited to, the following:

discriminating among various environmental sounds,
discriminating among different sounds of letters and words,
identifying simple everyday sounds,
recognizing rhyming words,
following simple one and two step directions,
identifying sounds in words,
reproducing simple sounds, letters, and words,
identifying beginning sounds in words,
identifying ending sounds in words,
identifying medial sounds in words,
using rhyming words to complete sentences,
identifying syllables in words, and
similar focuses.

This example illustrates the first of these diagnostic focuses, namely, discriminating among various environmental sounds. Environmental sounds are sounds which students are typically expected to know. Specialized sound databases are stored in the memory means which are appropriate to the user community. Example objects having common sounds 703 include those of a jet airplane, an animal, a telephone, and a musical instrument. The teacher selects the objects/ sound combinations to be presented to the student during the test. In this example, the sounds are associated with a dog, a telephone, and a bugle.

B. How the Student Performs the Diagnostic Test

Pictures 702 of a dog, a telephone, and a bugle are shown and the sound 704 of one of these objects is reproduced while the student is asked to use the mouse to click on the object which produces this sound. A preset time interval passes before another response is solicited from the student if one is not forthcoming. This time interval is teacher selectable. The next sound is then played and a response solicited. Sounds other than those for the objects shown on the screen can be mixed in with the correct ones at the option of the teacher. Typically the sounds are played in random order so that the student does not learn by the presented sequence of either the pictures or the sounds.

An alternative presentation technique is to place the picture of the single target object on the screen and successively play random object sounds, including that for the object shown. Upon hearing the sound associated with the target object, the student presses any key on the keyboard to indicate the sound/picture match. Other approaches within this process include, but are not limited to, the following:

reviewing with the student the sounds of all the objects shown in an appropriate manner,
using teacher-selected pictures from the database for presentation with the selected sound,
randomly showing pictures from the database for presentation with the selected sound,
showing one picture on the screen at a time while successively presenting multiple sounds which can be either teacher selected or randomly selected by the processor,
showing multiple pictures on the screen while successively providing sounds including the sound association being tested and asking the student to press a key on the keyboard immediately upon hearing the correct sound for the object,
moving the picture(s) around the screen between the time the student is first presented with the sound and the time they indicate their choice of target sound/picture match using the mouse or keyboard,
fixing the position of the picture(s) on the screen while the student indicates his choice of target sound/picture match using the keyboard,
using teacher-selectable time intervals for the student to make his indication of the target sound/picture match, and similar approaches.

C. How the System Analyzes the Results

The mouse click location is registered and, using the decision rules (FIGS. 12a–12c), the processor determines 708 if it corresponds to the location of the object which produces the sound presented to the student. If the mouse click location matches the location of the target object, the evaluation criterion of accuracy is applied and the number of successful tries incremented. If not, the number of unsuccessful tries is incremented. Other data are also recorded 712.

Assume the pictures of a dog, a telephone and a bugle are presented at known locations on the screen. The sound of one of those objects is then played and the student is asked to move the cursor to the object which makes that sound and click on it. The student can hear those sounds again by clicking on the speaker button located on the screen. The sound is repeated a specified number of times prior to completion of the task before moving to the next item in the test set. Incorrect matches are revisited during the test later or on subsequent tests. When the student clicks the mouse, the location of the cursor on the screen is noted when the click occurred and compared with the location of the correct object. If the cursor was within preset boundaries around the object, the selection is accepted as a correct match. The tightness of the boundaries can be set by the teacher during the test specification process. Small boundaries require improvements in pointing with the mouse and perhaps fine motor control to place the cursor entirely within the picture itself. After a predetermined period for making responses, the sound of one of the other objects and the student is played and asked for a match response. This activity illustrates how the decision rules (FIG. 12a) evaluation criterion of "Accuracy in response" is utilized along with the qualification of "Location on Screen" from the Comments column of that figure.

Assume only one of the test objects, say a dog, is displayed on the screen as a test of retentivity (FIG. 12a). A collection of common environmental sounds is then played with a pause between the sounds to allow the student to respond before the next sound is heard. This collection might include the sound of a train whistle, a jet airplane taking off, a drum beat, a dog barking, and a word being spoken. After these sounds are played, the student is asked to press any key on the keyboard upon hearing the sound of the object on the screen. Correct matches are duly registered.

Assume that the mother of a student reported to the teacher that she suspected the student could not hear certain high pitched sounds. Since pitch is related to frequency, the teacher designs a test to cover a range of frequencies. If needed, a neutral object is placed on the screen. The student is instructed to press a key or click the mouse when they could not hear the tone. Then a series of tones within the frequency range of normal human hearing is played. The student's response would indicate a frequency which were giving him trouble. Upon confirmation of these deficiencies, the information would be added to the database for that student. Later, when using FFT (Fast Fourier Transforms) analysis (FIG. 12) after an instructional lesson to determine frequency content of a student-recorded and saved sound, such as a phonogram or word, the FFT results might suggest deficiencies in audio learning ability. It could be reasoned that such deficiencies could be medical rather than educational. Alternative teaching paths can, of course, accomplish the same educational goal while the deficiencies were being remediated.

In the case where the student uses the keyboard to indicate his choice of a sound/object match, the keyboard input is interpreted as a "Yes" answer to the generic question "Does this sound (or object) go with the target object (or sound)?". If the keyboard input identifies the target sound/object pairing, the number of successful tries is incremented. If not, the number of unsuccessful tries is incremented. Other data are also recorded at this time.

The time between presentation of the sound and the completion of the match of that sound/object pair or the student advancing to the next sound/object pair in the test sequence is recorded for subsequent analysis. Other data recorded includes, but is not limited to, the following:

the time and date of the test, the total time required for the test, the time-on-task associated with each sound/object pair, the number of successful matches for each sound/object pair, the average time in making matches for each sound/object pair, other relevant data.

This information is saved on the memory unit 246 for later processing and analysis 710 in the ANALYZE module 410.

D. How the System Remediates the Identified Deficiencies

Using the PRESCRIBE module 412, measures appropriate for remediation of the deficiencies identified 710 are retrieved from the memory of the computer 240 and suggested as follows. If, for example, there were significant deficiencies in identifying certain sound/object pairs, as determined by the accuracy and repeatability of the student upon hearing the sound of an object seen on the screen amongst one or more other objects, it would be prescribed that these difficult pairs be presented to the student in a review lesson conducted separate and apart from the test environment or as a prelude to the next scheduled test of this channel of learning. Accuracy can be specified by the teacher prior to running the ANALYZE module or by the System on the basis of saved performance data for that student. The difficult to match sound/object pair could be mixed with sound/object pairs not previously used. These new sound/object pairs could include previously correctly matched pairs.

In selecting the specific remediation process from those suggested, the teacher has the option of selecting from several available such suggestions, and may even combine suggested remediation processes. In this manner, not only does the teacher have the ability to select suggested processes based on her knowledge of the student and the student's past history, but so also does the System take such factors into account. For instance, in the event a student had not previously been exposed to certain environmental stimuli (as detected by the student's inability to match certain icons with the sounds produced by the animal or device pictured in that icon), the suggested remediation process would first teach those sound/object pairs. Alternatively, the teacher could select a set of sound/object pairs based on her familiarity with, for instance, the student's ethnic or cultural background.

In the presently preferred embodiment, the SYSTEM COMPONENTS are controlled by a program run on a central processing unit. It is not intended, however, to limit the scope of the present invention to any one specific embodiment of such a program. Instead, it is intended that changes in the specific implementation of the invention which do not depart from the manner in which the components thereof function to achieve the desired results be included within the scope of the following claims.

What is claimed is:

1. A method of diagnosing and remediating a deficiency in the communication skill of a student resulting from utilization of one or more sensory channels utilizing a computer including processing, storage, and input and output means comprising the steps of:

(a) selecting material stored in the storage means of the computer for testing the communication skill of the student;

(b) presenting the selected test material to the student using computer generated stimuli and the output means of the computer;

(c) recording the student's responses to the stimuli through the input means of the computer;

(d) analyzing the recorded responses to identify any deficiencies in a sensory channel either for presenting the stimuli or for responding thereto using the processing means of the computer;

(e) using the results of the analysis to identify a cognitive strategy utilizing the sensory channel in which a deficiency is identified and the input and output means of the computer to develop proficiency in the communication skills resulting from utilization of the sensory channel in which the deficiency was identified;

(f) assessing the results of the application of the cognitive strategy by testing the student's proficiency in the communication skills resulting from utilization of the sensory channel in which the deficiency was identified; and (g) repeating steps (b) through (f) if the results of step (f) do not exceed a predetermined performance criterion.

2. A method of diagnosing and remediating a deficiency in the communication skill of a student resulting from utilization of one or more sensory channels utilizing a computer including processing, storage, and input and output means comprising the steps of:

(a) selecting material stored in the storage means of the computer for testing the communication skill of the student;

(b) presenting the selected test material to the student using computer generated stimuli and the output means of the computer;

(c) recording the student's responses to the stimuli through the input means of the computer;

(d) analyzing the recorded responses to identify any deficiencies in a sensory channel either for presenting the stimuli or for responding thereto using the processing means of the computer;

(e) using the results of the analysis to identify a cognitive strategy utilizing a combination of other sensory channels to compensate for the sensory channel in which a deficiency is identified and the input and output means of the computer to develop proficiency in the communication skills resulting from utilization of the sensory channel in which the deficiency was identified;

(f) assessing the results of the application of the cognitive strategy by testing the student's proficiency in the communication skills resulting from utilization of the sensory channel in which the deficiency was identified; and (g) repeating steps (b) through (f) if the results of step (f) do not exceed a predetermined performance criterion.

\* \* \* \* \*